(12) United States Patent
Beale et al.

(10) Patent No.: US 12,279,300 B2
(45) Date of Patent: Apr. 15, 2025

(54) INFRASTRUCTURE EQUIPMENT, COMMUNICATIONS DEVICES, AND METHODS

(71) Applicant: Sony Group Corporation, Tokyo (JP)

(72) Inventors: Martin Warwick Beale, Basingstoke (GB); Shin Horng Wong, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 532 days.

(21) Appl. No.: 17/631,895

(22) PCT Filed: Jul. 27, 2020

(86) PCT No.: PCT/EP2020/071147
§ 371 (c)(1),
(2) Date: Feb. 1, 2022

(87) PCT Pub. No.: WO2021/028208
PCT Pub. Date: Feb. 18, 2021

(65) Prior Publication Data
US 2022/0287053 A1 Sep. 8, 2022

(30) Foreign Application Priority Data
Aug. 15, 2019 (EP) .................. 19191997

(51) Int. Cl.
*H04W 72/12* (2023.01)
*H04W 72/20* (2023.01)
*H04W 72/566* (2023.01)

(52) U.S. Cl.
CPC ......... *H04W 72/569* (2023.01); *H04W 72/20* (2023.01)

(58) Field of Classification Search
CPC ... H04W 72/569; H04W 72/20; H04W 28/18; H04W 72/21; H04W 72/23
See application file for complete search history.

(56) References Cited

U.S. PATENT DOCUMENTS

2008/0014946 A1* 1/2008 Kubota ................. H04W 36/02
455/436
2015/0208310 A1* 7/2015 Taneja ............... H04W 36/0044
370/331

(Continued)

FOREIGN PATENT DOCUMENTS

CN 108605342 A 9/2018
EP 1879416 A1 1/2008

(Continued)

OTHER PUBLICATIONS

International Search Report and Written Opinion mailed on Oct. 13, 2020, received for PCT Application PCT/EP2020/071147, Filed on Jul. 27, 2020, 12 pages.

(Continued)

*Primary Examiner* — John D Blanton
(74) *Attorney, Agent, or Firm* — XSENSUS LLP

(57) ABSTRACT

An infrastructure equipment of a wireless communications network comprises transceiver circuitry and controller circuitry configured in combination with the transceiver circuitry to transmit, to a communications device, a first control signal providing an indication of a set of downlink communications resources of the wireless access interface in which the infrastructure equipment is going to transmit a plurality of transport blocks to the communications device, wherein the plurality of transport blocks comprises a first plurality of transport blocks that are to be transmitted in a first set of downlink communications resources and a second plurality of transport blocks that are to be transmitted in a second set of downlink communications resources, the first set of (Continued)

downlink communications resources and the second set of downlink communications resources being separated in time by a scheduling gap formed by a third set of downlink communications resources of the wireless access interface.

20 Claims, 20 Drawing Sheets

(56) References Cited

U.S. PATENT DOCUMENTS

| | | |
|---|---|---|
| 2017/0317806 A1 | 11/2017 | Beale |
| 2019/0104537 A1* | 4/2019 | Yasukawa .......... H04W 74/0833 |
| 2020/0037244 A1* | 1/2020 | Fließ .................. H01M 10/425 |
| 2020/0068646 A1* | 2/2020 | Kwon ................. H04W 68/005 |
| 2020/0314816 A1* | 10/2020 | Yi ........................ H04L 5/0094 |
| 2021/0243731 A1* | 8/2021 | Shin ..................... H04L 5/0094 |
| 2021/0274536 A1* | 9/2021 | Shin ..................... H04W 72/535 |
| 2022/0070911 A1* | 3/2022 | Baldemair ............ H04L 5/0094 |
| 2022/0287053 A1* | 9/2022 | Beale .................... H04W 28/18 |

FOREIGN PATENT DOCUMENTS

| | | |
|---|---|---|
| EP | 3439409 A1 | 2/2019 |
| JP | 2019503145 A | 1/2019 |
| WO | 2013/051428 A1 | 4/2013 |
| WO | 2018/130514 A1 | 7/2018 |

OTHER PUBLICATIONS

Samsung, Scheduling of multiple transport blocks for NB-Iot:, 3GPP TSG RAN WG1 Meeting #96bis, R1 1904383, Apr. 8-12, 2019, Xi'an, China.

* cited by examiner

INFRASTRUCTURE EQUIPMENT, COMMUNICATIONS DEVICES, AND METHODS

CROSS-REFERENCE TO RELATED APPLICATIONS

The present application is based on PCT/EP2020/071147 filed on Jul. 27, 2020, and claims priority to EP 19191997.6 filed on Aug. 15, 2019, the entire contents of each are incorporated herein by reference.

BACKGROUND

Field of Disclosure

The present disclosure relates to communications devices, infrastructure equipment and methods for the transmission of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently, there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC); see, for example, [1], [2], [3], [4]. The IoT is further enhanced in 3GPP by the introduction of two additional Release 16 Work Items, namely A-MTC (Additional Machine Type Communications Enhancements) [5] and A-NB-IoT (Additional Enhancements for Narrowband Internet of Things) [6].

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

A first embodiment of the present technique can provide an infrastructure equipment forming part of a wireless communications network. The infrastructure equipment is configured to transmit data or receive data and comprises transceiver circuitry configured to transmit signals and receive signals via a wireless access interface provided by the wireless communications network, and controller circuitry configured in combination with the transceiver circuitry to transmit, to a communications device, a first control signal providing an indication of a set of downlink communications resources of the wireless access interface in which the infrastructure equipment is going to transmit a plurality of transport blocks to the communications device, wherein the plurality of transport blocks comprises a first plurality of transport blocks that are to be transmitted in a first set of downlink communications resources and a second plurality of transport blocks that are to be transmitted in a second set of downlink communications resources, the first set of downlink communications resources and the second set of downlink communications resources being separated in time by a scheduling gap formed by a third set of downlink communications resources of the wireless access interface, and to transmit, to the communications device during the scheduling gap, a second control signal providing an indication of at least one change relating to the second plurality of transport blocks.

In some arrangements of the first embodiment of the present technique, the at least one change relating to the second plurality of transport blocks is that the scheduling gap is extended in time. In other arrangements of the first embodiment of the present technique, the at least one change relating to the second plurality of transport blocks is that the infrastructure equipment is not going to transmit one or more of the second plurality of transport blocks indicated by the first control signal. In other arrangements of the first embodiment of the present technique, wherein the at least one change relating to the second plurality of transport blocks is a change in at least one communications parameter of the second set of downlink communications resources indicated by the first control signal.

A second embodiment of the present technique can provide an infrastructure equipment forming part of a wireless communications network. The infrastructure equipment is configured to transmit data or receive data and comprises transceiver circuitry configured to transmit signals and receive signals via a wireless access interface provided by the wireless communications network, and controller circuitry configured in combination with the transceiver circuitry to transmit, to a communications device, a first control signal providing an indication of a set of uplink communications resources of the wireless access interface in which the communications device is to transmit a plurality of transport blocks to the infrastructure equipment, wherein the plurality of transport blocks comprises a first plurality of transport blocks that are to be transmitted in a first set of uplink communications resources and a second plurality of transport blocks that are to be transmitted in a second set of uplink communications resources, the first set of uplink communications resources and the second set of uplink communications resources being separated in time by a scheduling gap formed by a third set of uplink communications resources of the wireless access interface, and to transmit, to the communications device during the scheduling gap, a second control signal providing an indication of at least one change relating to the second plurality of transport blocks.

In some arrangements of the second embodiment of the present technique, the at least one change relating to the second plurality of transport blocks is that the scheduling gap is extended in time. In other arrangements of the second embodiment of the present technique, the at least one change relating to the second plurality of transport blocks is that the communications device should not transmit one or more of the second plurality of transport blocks indicated by the first control signal. In other arrangements of the second embodiment of the present technique, wherein the at least one change relating to the second plurality of transport blocks is a change in at least one communications parameter of the second set of uplink communications resources indicated by the first control signal.

Embodiments of the present technique, which further relate to communications devices, methods of operating infrastructure equipment and communications devices, and circuitry for infrastructure equipment and communications devices, can allow for the enhancement of scheduling of multi-TB transmissions, whilst alleviating at least some of the issues relating to the transmission of multi-TBs.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
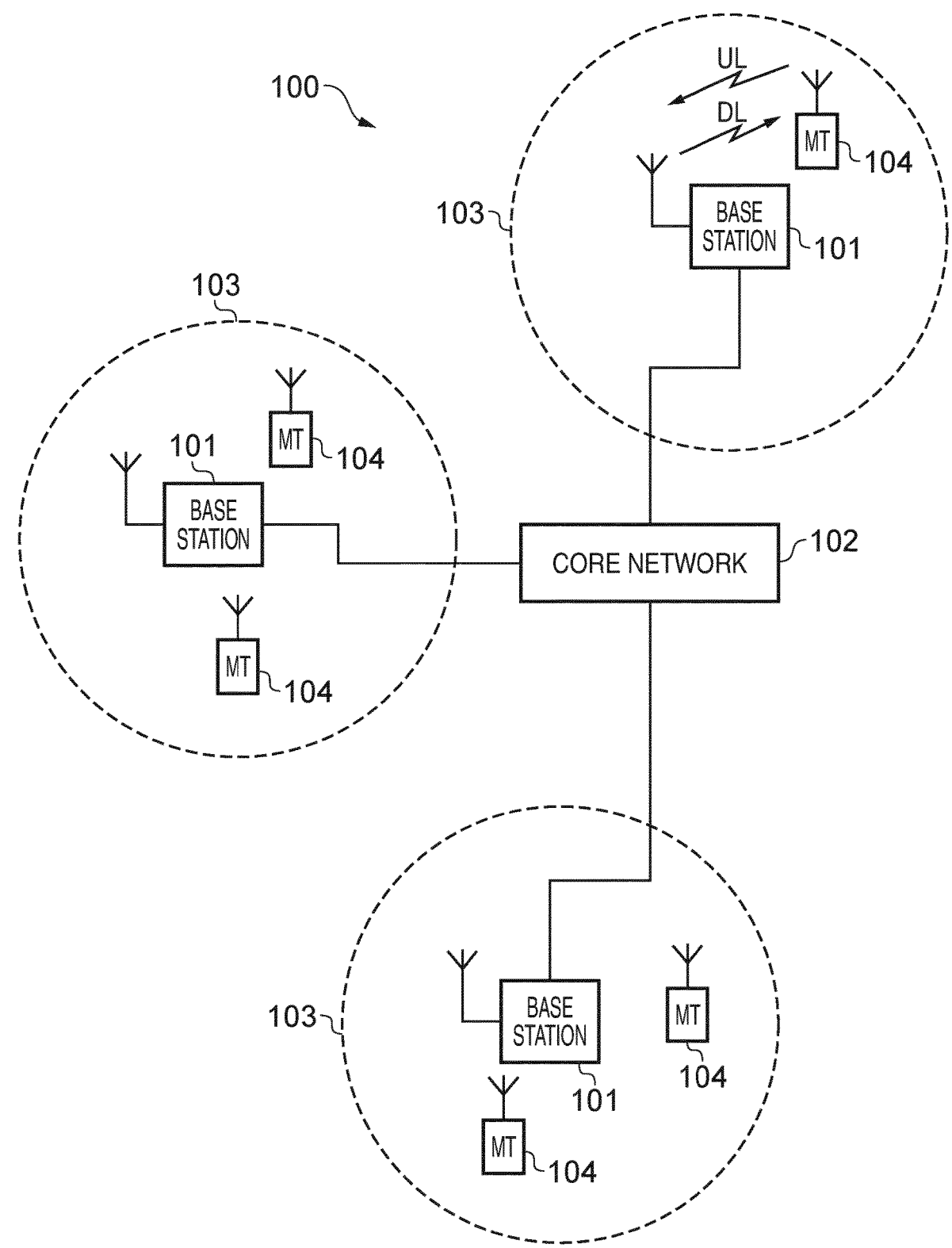
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [7]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink (DL). Data is transmitted from terminal devices 104 to the base stations 101 via a radio uplink (UL). The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
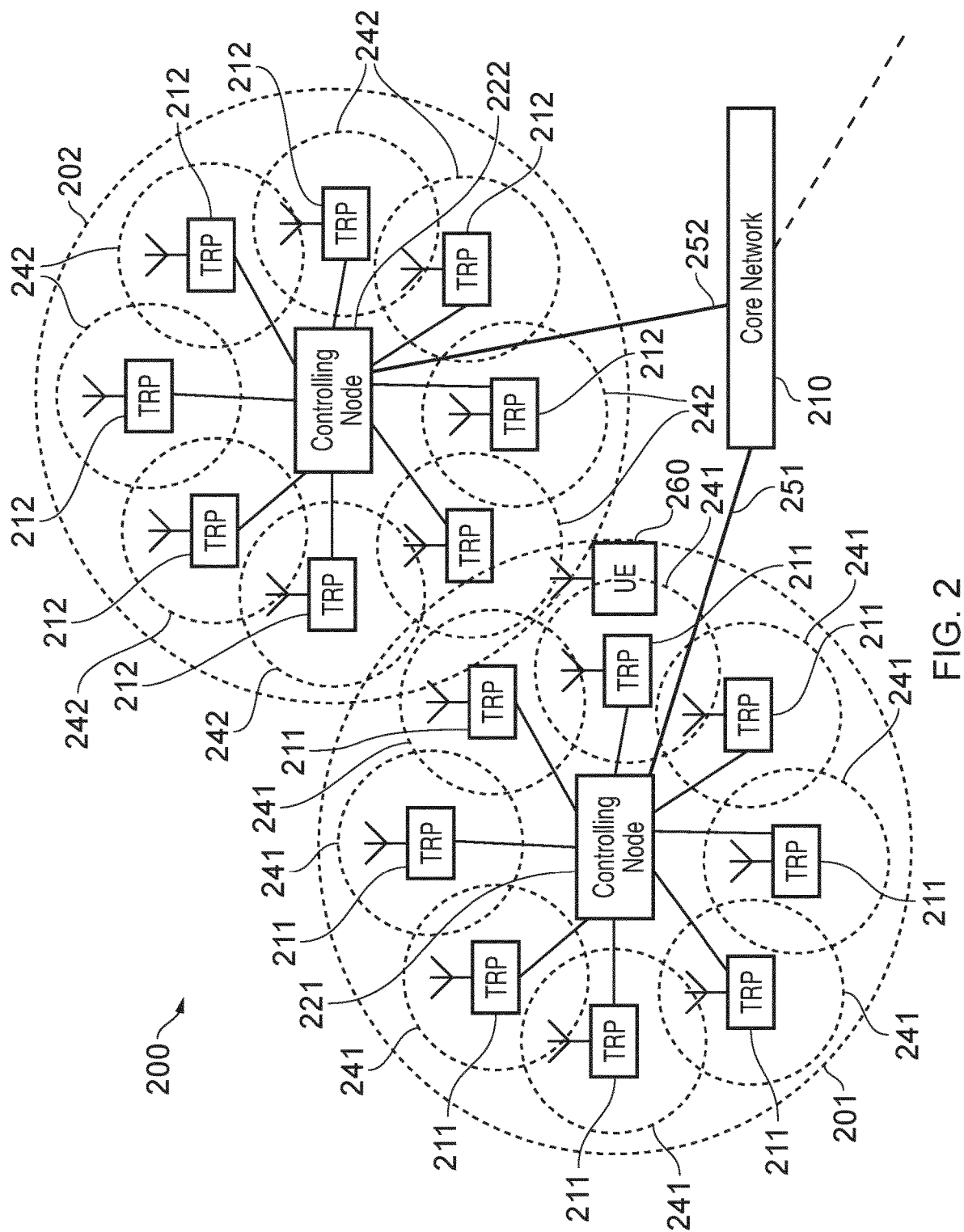
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links The distributed units (DUs) 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
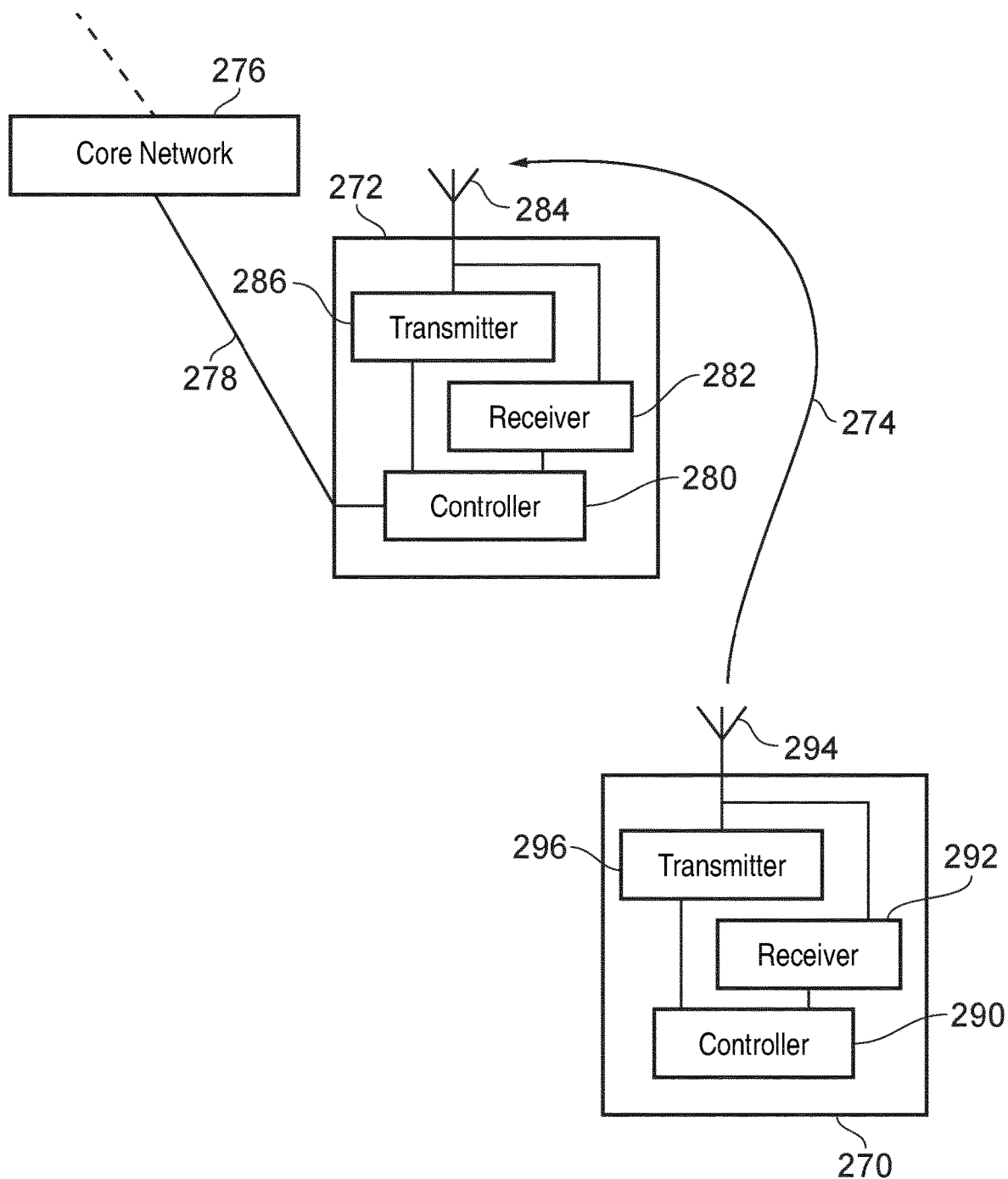
FIG. 3 is a schematic block diagram of an example infrastructure equipment and communications device which may be configured to operate in accordance with certain embodiments of the present disclosure.

A more detailed illustration of a UE 270 and an example network infrastructure equipment 272, which may be thought of as an eNB 101 or a combination of a controlling node 221 and TRP 211, is presented in FIG. 3. As shown in FIG. 3, the UE 270 is shown to transmit uplink data to the infrastructure equipment 272 via resources of a wireless access interface as illustrated generally by an arrow 274. The UE 270 may similarly be configured to receive downlink data transmitted by the infrastructure equipment 272 via resources of the wireless access interface (not shown). As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Enhanced Scheduling of Transport Blocks

One of the objectives of Rel-16 A-MTC [6] is to enhance scheduling of DL/UL transport blocks (TBs):

Specify scheduling multiple DL/UL transport blocks with or without DCI for SC-PTM and unicast [RAN1, RAN2], Enhancement of SPS can be discussed [6].

Figure 4:
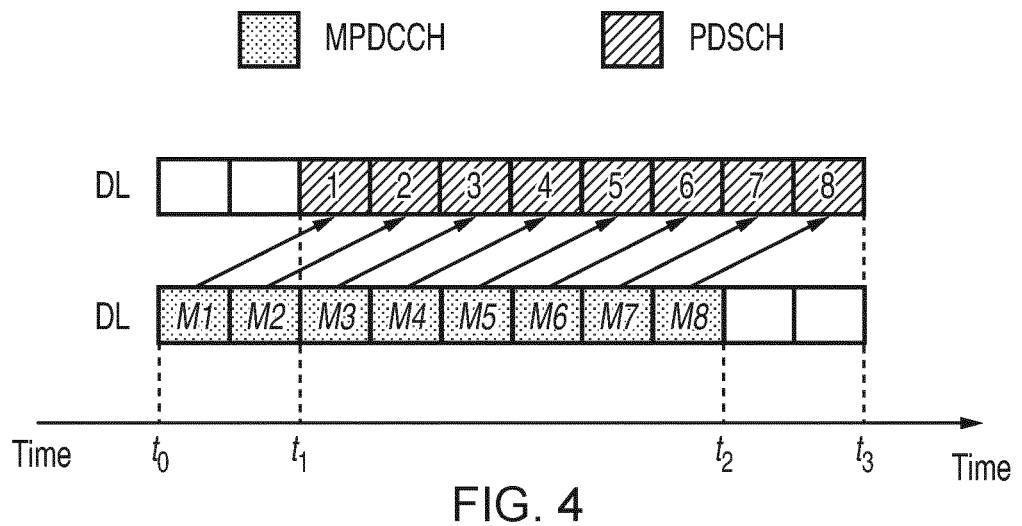
FIG. 4 shows an example of how, as in the legacy enhanced Machine Type Communications (eMTC) a single MTC Physical Downlink Control Channel (MPDCCH) may schedule a single Physical Downlink Shared Channel (PDSCH)

In the legacy enhanced Machine Type Communications (eMTC) system, a single Downlink Control Information (DCI) carrying an UL Grant or a DL Grant schedules a single Physical Uplink Shared Channel (PUSCH) TB or single Physical Downlink Shared Channel (PDSCH) TB respectively. The maximum Transport Block Size (TBS) for a PDSCH is 1000 bits. If the eNB has 8000 data bits to send to a UE, it has to send 8 MTC-Physical Downlink Control Channels (MPDCCHs) for 8 DL Grants to schedule 8 PDSCHs, where each PDSCH has a TBS of 1000 bits. This is shown in an example in FIG. 4, where the eNB transmits 8 MPDCCHs, labelled as {M1, M2, M3, M4, M5, M6, M7, M8} to schedule 8 corresponding PDSCHs labelled {1, 2, 3, 4, 5, 6, 7, 8}.

Figure 5:
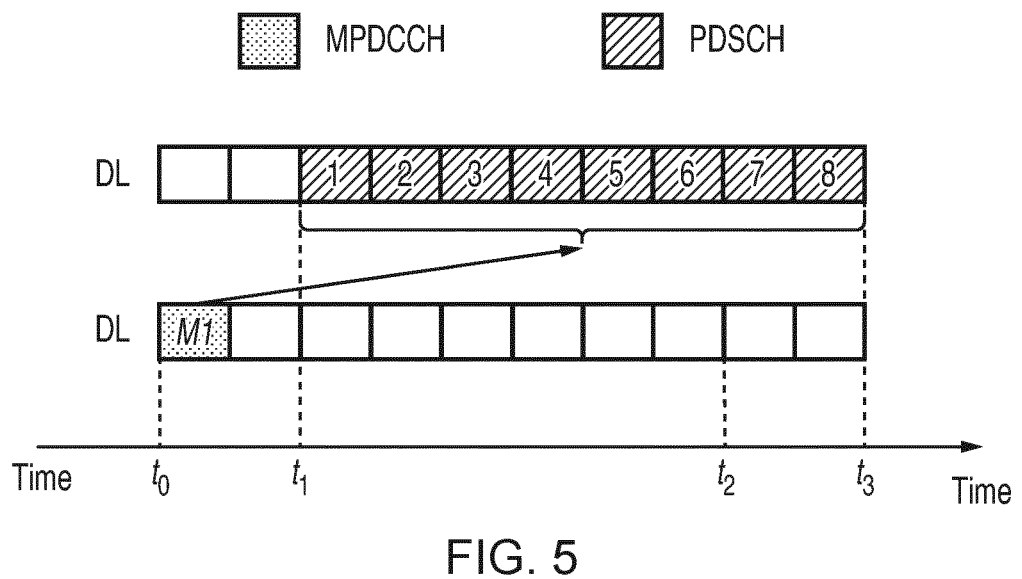
FIG. 5 shows an example of how, as in Additional MTC (A-MTC) a single MPDCCH may schedule multiple PDSCHs.

The legacy eMTC system of using a single MPDCCH to schedule a single TB (PUSCH or PDSCH) is inefficient. Hence, in Rel-16 A-MTC [6], "multiple TB per DCI" scheduling is introduced, where a single DCI can schedule more than one TB. An example is shown in FIG. 5, where the eNB has 8000 data bits to send to the UE. Here, it transmits a single DCI, carried by MPDCCH M1, carrying a single DL Grant scheduling 8 PDSCH TBs, where each PDSCH transmits a 1000 bit transport block. The maximum number of TBs that can be scheduled by a single DCI is 8 TBs and 4 TBs for CE Mode A and CE Mode B respectively.

Figure 6:
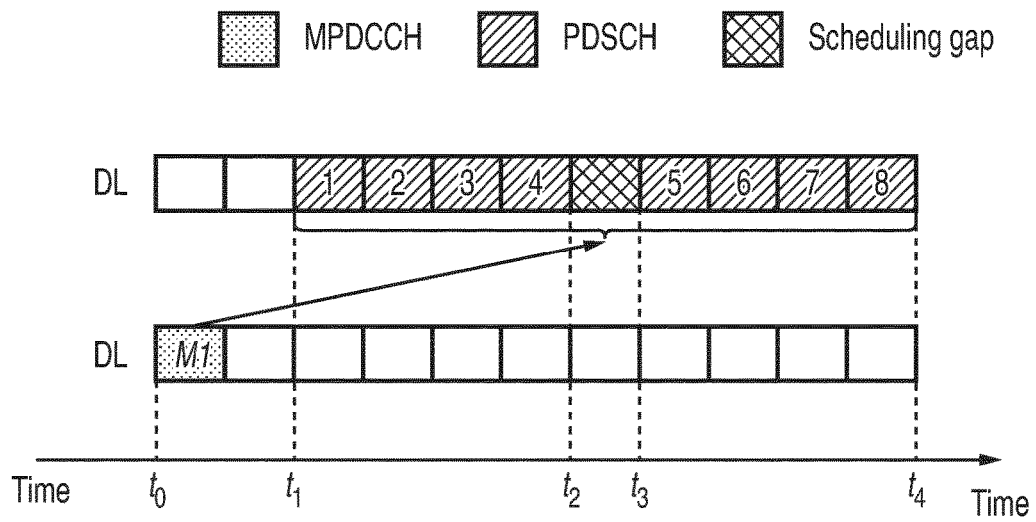
FIG. 6 shows an example of multi-Transport Block (TB) transmission with a scheduling gap during this multi-TB transmission.

When multiple transport blocks are scheduled via a single DCI, communications resources are assigned to the UE (either in the DL or in the UL) for a long period of time (i.e. for the period of time necessary to schedule the multiple transport blocks). At the time of scheduling, the eNodeB does not know whether it is going to need to schedule another UE during that long period of time, and hence there is a risk in the eNodeB scheduling the multiple transport blocks (the risk being that the eNodeB might want to use the scheduled communication resources for some other reason in the future). Hence, 3GPP has introduced the concept of a "scheduling gap" during a multi-TB transmission, as illustrated in FIG. 6. FIG. 6 shows the following operations at the following times:

$t_0$: MPDCCH (labelled M1) schedules a multi-TB PDSCH starting at $t_1$;

$t_1$ to $t_2$: the first four transport blocks of the multi-TB transmission are sent to the UE on PDSCH;

$t_2$ to $t_3$: scheduling gap where a PDSCH is not transmitted to the UE and the UE does not attempt to decode PDSCH (it should be appreciated that, although the scheduling gap is shown in FIG. 6 as being one sub-frame, it could be longer than this); and $t_3$ to $t_4$: transmission of the final four transport blocks of the multi-TB transmission.

The usage of the scheduling gap depends on system implementations. Some potential uses are:

Transmission of MPDCCH to allocate resources for another eMTC UE;

Transmission of MPDCCH to allocate resources in the other link direction for the same UE (e.g. referring to FIG. 6, the scheduling gap could be used to schedule a PUSCH transmission from the UE); or Transmission of PDSCH resources for another LTE UE. For example, a smartphone could be scheduled with PDSCH resources during the scheduling gap.

Figure 7:
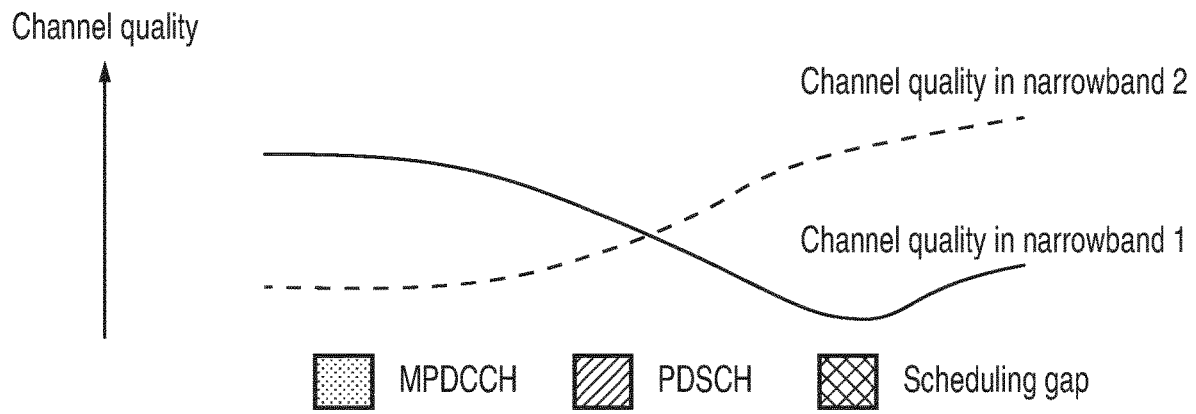
FIG. 7 illustrates an example of how channel conditions can change during the extent of a multi-TB transmission.
Figure 7:
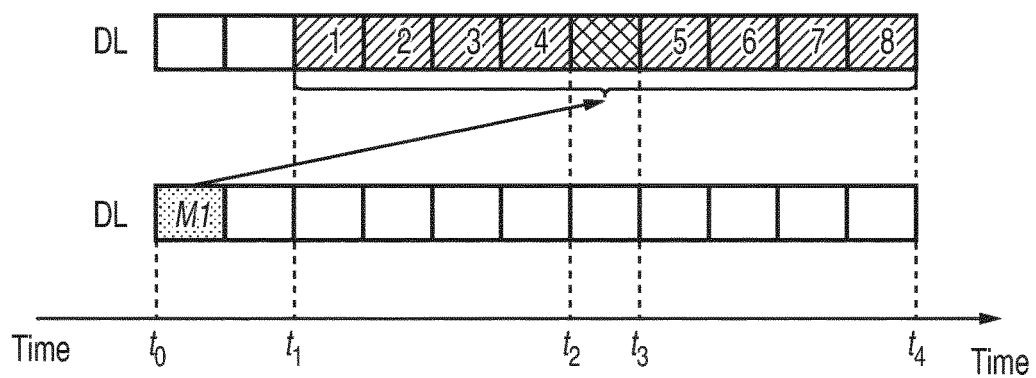

There are several issues with the transmission of multi-TBs to or from the UE, including:

The fixed duration of the scheduling gap means that any other traffic that is scheduled during the scheduling gap is constrained to use only the resources that are available during the scheduling gap;

There is no mechanism for the UE to receive or transmit acknowledgements during the scheduling gap;

For a short transmission (e.g. as per legacy operation), the eNodeB can choose favourable communications resources for those transmissions. For example, the eNodeB can perform frequency selective scheduling to choose non-faded communication resources for the transmission. Multi-TB transmissions might extend beyond the coherence time of the channel and hence some of the transport blocks that are transmitted at a later time might be subject to poor channel conditions. This issue is shown in FIG. 7. The eNodeB scheduler has channel knowledge (e.g. via a Channel Quality Indicator (CQI) report) that channel conditions are good in narrowband 1 at time $t_0$ and hence the eNodeB schedules a multi-TB transmission to the UE using NB1, where the multi-TB transmission extends between times $t_1$ and $t_4$. During transmission of the multi-TB transmission, channel quality in NB1 deteriorates, such that by the time of the scheduling gap, $t_2$, NB1 channel conditions are poor and a different narrowband, NB2, has better channel conditions. However, the eNodeB and UE are still committed to using NB1 for the PDSCH transmission due to the scheduling decision made at time $t_0$. In this case, transport blocks 5, 6, 7, 8 in FIG. 7 might be received in error at the UE.

Embodiments of the present technique seek to enhance the scheduling of multi-TB transmissions, whilst alleviating at least some of the issues with the transmission of multi-TBs as described above.

Multi Transport Block Scheduling Gap Usage

Figure 8A:
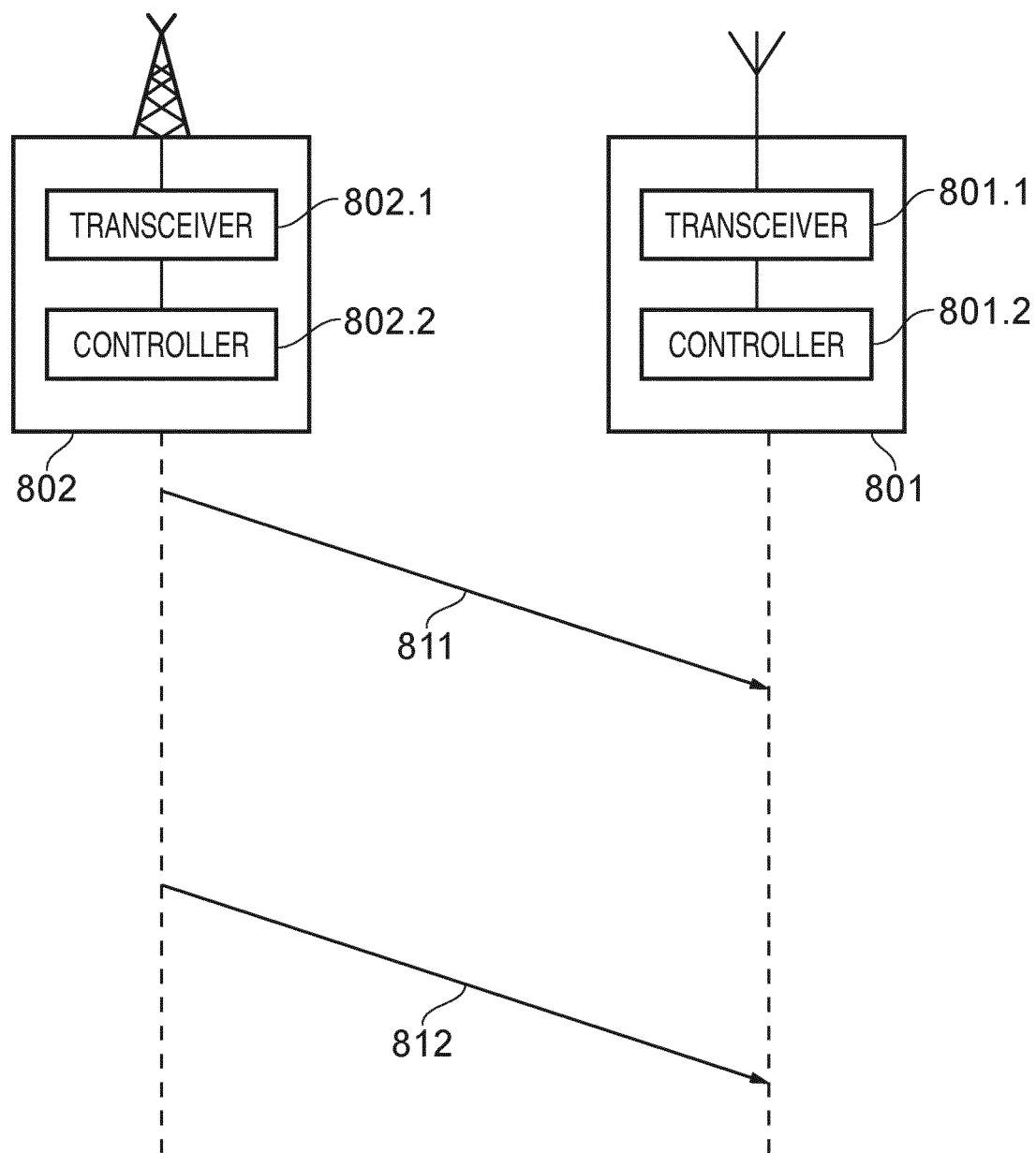
FIG. 8A shows a first example part schematic, part message flow diagram representation of a wireless communications network comprising a communications device and an infrastructure equipment in accordance with embodiments of the present technique.
Figure 8B:
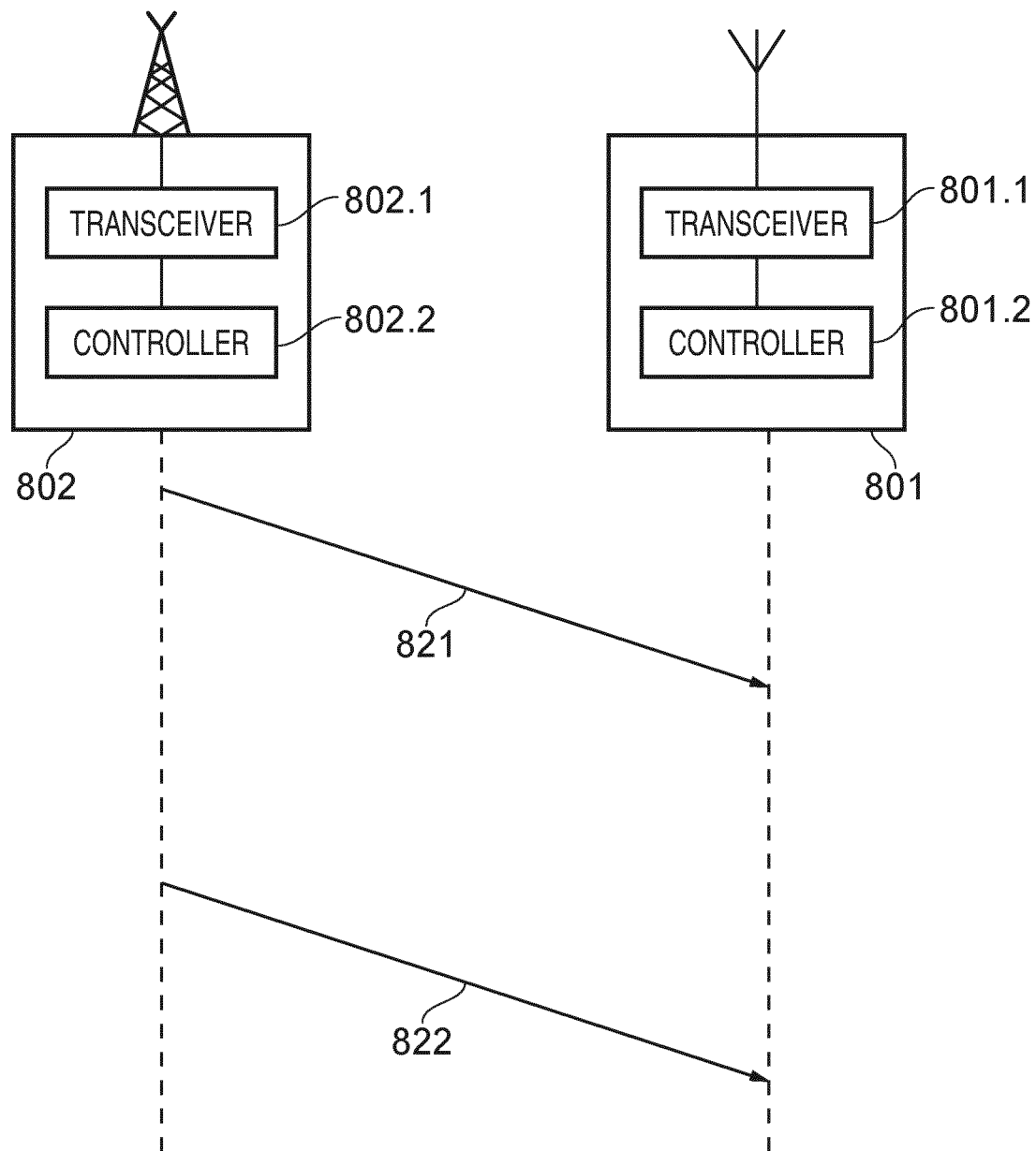
FIG. 8B shows a second example part schematic, part message flow diagram representation of a wireless communications network comprising a communications device and an infrastructure equipment in accordance with embodiments of the present technique.

FIGS. 8A and 8B each show part schematic, part message flow diagram representations of a wireless communications network comprising a communications device 801 and an infrastructure equipment 802 in accordance with at least some embodiments of the present technique. In the examples of each of FIGS. 8A and 8B, the communications device 801 is configured to transmit data to or receive data from an infrastructure equipment 802, via a wireless access interface provided by the wireless communications network. The communications device 801 and the infrastructure equipment 802 each comprise a transceiver (or transceiver circuitry) 801.1, 802.1, and a controller (or controller circuitry) 801.2, 802.2. Each of the controllers 801.2, 802.2 may be, for example, a microprocessor, a CPU, or a dedicated chipset, etc.

As shown in the example of FIG. 8A, the transceiver circuitry 802.1 and the controller circuitry 802.2 of the infrastructure equipment 802 are configured in combination to transmit 811, to the communications device 801, a first control signal providing an indication of a set of downlink communications resources of the wireless access interface in which the infrastructure equipment 802 is going to transmit a plurality of transport blocks to the communications device 801, wherein the plurality of transport blocks comprises a first plurality of transport blocks that are to be transmitted in a first set of downlink communications resources and a second plurality of transport blocks that are to be transmitted in a second set of downlink communications resources, the first set of downlink communications resources and the second set of downlink communications resources being separated in time by a scheduling gap formed by a third set of downlink communications resources of the wireless access interface, and to transmit 812, to the communications device 801 during the scheduling gap, a second control signal providing an indication of at least one change relating to the second plurality of transport blocks.

As shown in the example of FIG. 8B, the transceiver circuitry 802.1 and the controller circuitry 802.2 of the infrastructure equipment 802 are configured in combination to transmit 821, to the communications device 801, a first control signal providing an indication of a set of uplink communications resources of the wireless access interface in which the communications device 801 is to transmit a plurality of transport blocks to the infrastructure equipment 802, wherein the plurality of transport blocks comprises a first plurality of transport blocks that are to be transmitted in a first set of uplink communications resources and a second plurality of transport blocks that are to be transmitted in a second set of uplink communications resources, the first set of uplink communications resources and the second set of uplink communications resources being separated in time by a scheduling gap formed by a third set of uplink communications resources of the wireless access interface, and to transmit 822, to the communications device 801 during the scheduling gap, a second control signal providing an indication of at least one change relating to the second plurality of transport blocks.

Here, the scheduling gap may be indicated in the first control signal by the infrastructure equipment to the communications device, or may be determined by the communications device in another manner For example, the communications device may receive Radio Resource Control (RRC) signalling which tells the communications device how often it should insert scheduling gaps (for example, after every four TBs). The communications device may determine when to insert scheduling gaps based on other criteria, or based on definitions in the specifications.

Essentially, embodiments of the present technique propose to indicate, during the scheduling gap of a multi-TB transmission (i.e. the combination of the first plurality of transport blocks and the second plurality of transport blocks), a change in the characteristic of the multi-TB transmission. This said indication can be transmitted using an MPDCCH. The following arrangements of embodiments of the present technique describe the said change in characteristics of the multi-TB transmission.

Extending Scheduling Gap Duration

In an arrangement of embodiments of the present technique, when another user is scheduled in the scheduling gap, the eNB sends an MPDCCH to the UE that extends the scheduling gap. In other words, the at least one change relating to the second plurality of transport blocks is that the scheduling gap is extended in time. The scheduling gap may be extended in time by an amount indicated by the second control signal, or this amount may be RRC signalled to the UE. The eNB can then schedule another UE in the uplink or downlink during the scheduling gap, and so the UE does not receive a PDSCH or transmit a PUSCH during the extended multi-TB scheduling gap.

The extended scheduling gap can either be created by pausing the multi-TB transmission or skipping parts of the multi-TB transmission. For a paused transmission, the total duration of the remainder of the multi-TB transmission is unchanged (the start time of the remainder of the multi-TB transmission is just delayed in time). For a skipped transmission, those subframes of the multi-TB transmission that fall within the time window of the extended scheduling gap duration are not transmitted or received. In this case, the end time of the skipped multi-TB transmission does not change, despite the extended scheduling gap.

Figure 9:
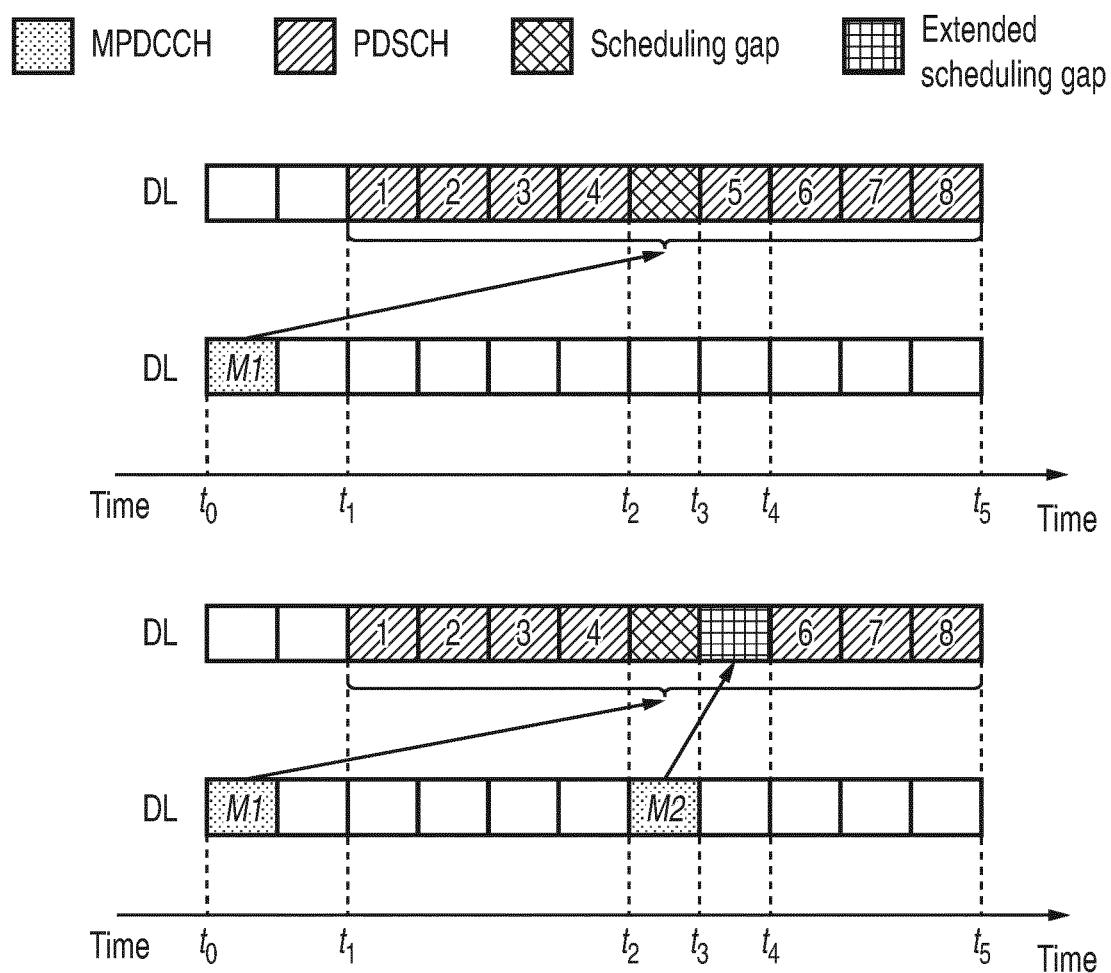
FIG. 9 shows an example of how the scheduling gap can be extended through the skipping of one or more TBs in accordance with embodiments of the present technique.

FIG. 9 shows an extended scheduling gap created through a "skipping" process. The upper portion of FIG. 9 shows operation without an extended scheduling gap and the lower portion shows operation with an extended scheduling gap. In the lower portion of FIG. 9, during the scheduling gap, an MPDCCH labelled M2 extends the scheduling gap in a "skipping" mode. M2 is sent between time $t_2$ and $t_3$ and extends the scheduling gap to be between times $t_2$ and $t_4$ (whereas the original scheduling gap occupied a time between $t_2$ and $t_3$). Transport block "5" from the multi-TB transmission is skipped between times $t_3$ and $t_4$ to allow for the scheduling of another UE. In this example, transport block "5" is not transmitted by the eNB and could be re-transmitted at a future time (this is not shown in FIG. 9). In other words, in the example of FIG. 9, the scheduling gap is to be extended by the infrastructure equipment not transmitting at least one of the second plurality of transport blocks, wherein the first control signal had indicated that the infrastructure equipment was going to transmit the at least one of the second plurality of transport blocks before the others of the second plurality of transport blocks. The procedure of skipping transport blocks when the scheduling gap is extended may be indicated by RRC signalling from the network to the UE, or may be known by the UE in advance and defined in the specifications. Further, the second control signal may explicitly indicate to the UE that the scheduling gap is to be extended in this way. It should be appreciated by those skilled in the art that if transport block "5" had been transmitted using a plurality of repetitions (e.g. for the purposes of coverage extension) and some of those repetitions were not received by the UE, it might still be possible for the UE to decode the transport block, even with the reduced number of repetitions.

Figure 10:
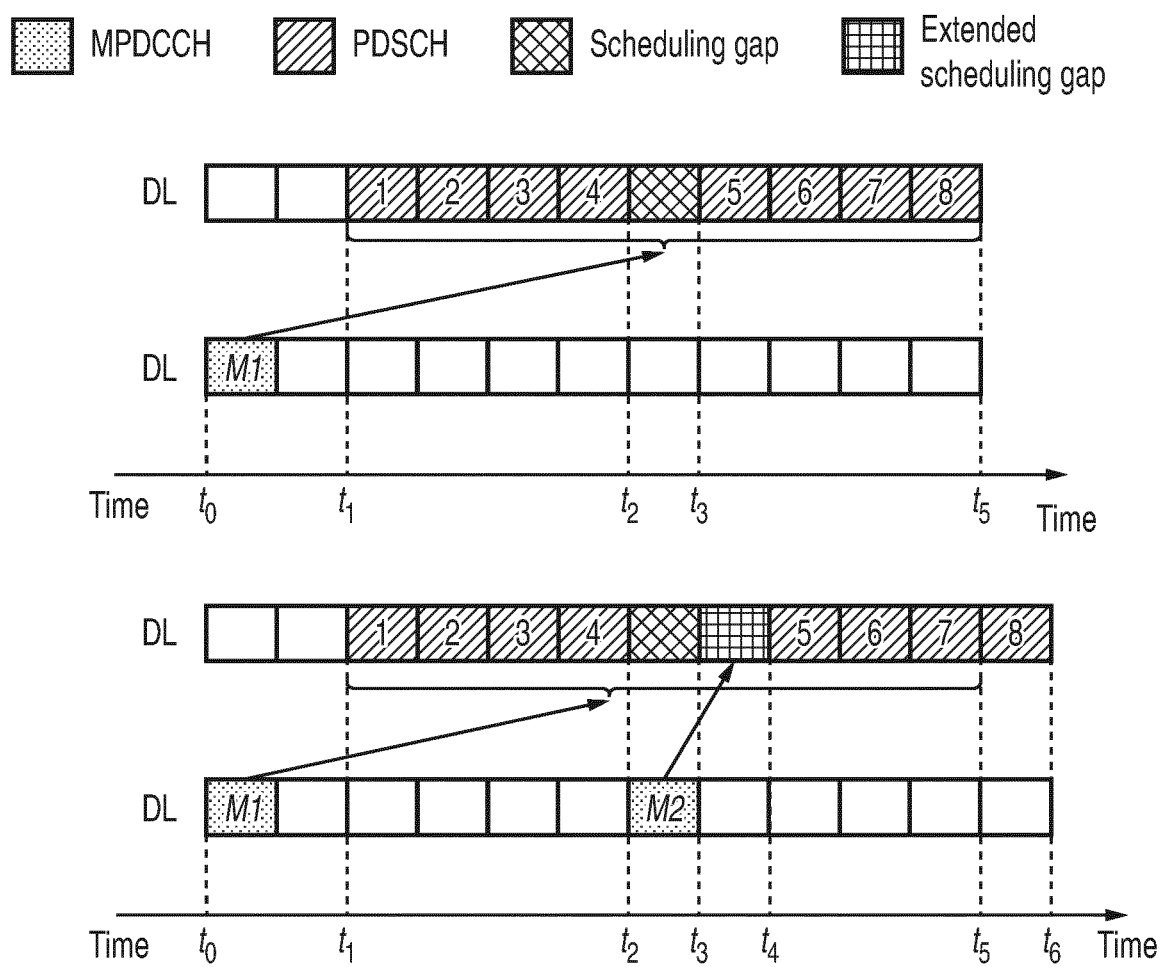
FIG. 10 shows an example of how the scheduling gap can be extended through the postponing of one or more TBs in accordance with embodiments of the present technique.

FIG. 10 shows an extended scheduling gap created through a "postponing" process. The example of FIG. 10 shows that during the scheduling gap, between $t_2$ and $t_3$, an MPDCCH, M2, extends the scheduling gap via a "postponing" method. The scheduling gap is hence extended to now end at time $t_4$. The multi-TB transport blocks are now postponed to occupy the time period between $t_4$ and $t_6$, rather than the time period between $t_3$ and $t_5$. In other words, the second control signal indicates that the scheduling gap is to be extended by shifting the second set of downlink communications resources in time. The second set of downlink communications resources may be shifted by the amount indicated by the second control signal, or the communications device may determine, once the second control signal has signalled that the second set of downlink communications resources are to be shifted in time, the amount of shift by looking up, for example, an "extension duration" that was previously signalled via RRC by the network.

Figure 11:
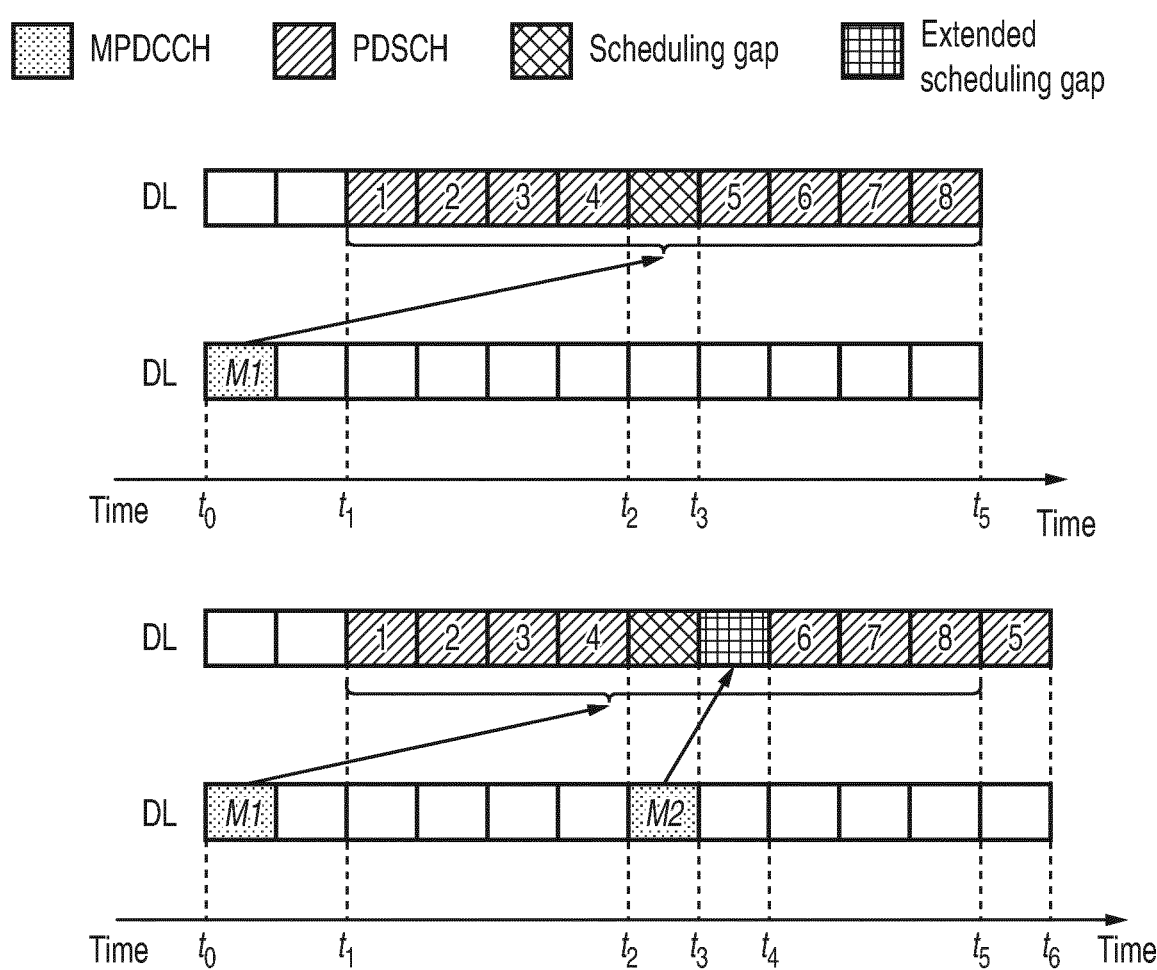
FIG. 11 shows an example of how the scheduling gap can be extended through the postponing of one or more TBs that fall within the extended scheduling gap to the end of the multi-TB transmission in accordance with embodiments of the present technique.

It will be appreciated by those skilled in the art that the order of the transport blocks might be re-arranged during the process of extended the scheduling gap. For example, when the scheduling gap is extended through postponing, the transport blocks that fell within the extended scheduling gap could be transmitted following the last of the multi-TB transport blocks, as shown in FIG. 11. In other words, the scheduling gap is to be extended by the infrastructure equipment transmitting at least one of the second plurality of transport blocks after the others of the second plurality of transport blocks, wherein the first control signal had indicated that the infrastructure equipment was going to transmit the at least one of the second plurality of transport blocks before the others of the second plurality of transport blocks. The procedure of postponing transport blocks when the scheduling gap is extended may be indicated by RRC signalling from the network to the UE, or may be known by the UE in advance and defined in the specifications. Further, the second control signal may explicitly indicate to the UE that the scheduling gap is to be extended in this way. The example of FIG. 11 is similar to that of FIG. 10, but:

The timing of transport blocks 6, 7, 8 is not changed; and
Transport block 5 is transmitted following transport blocks 6, 7, 8, since transport block 5 fell within the duration of the extended scheduling gap.

In another implementation of this arrangement of embodiments of the present technique, the MPDCCH that extends the scheduling gap is a group MPDCCH. The group MPDCCH indicates that a scheduling gap is being extended and any UE that is currently decoding the group MPDCCH during the time duration of the scheduling gap is subject to that scheduling gap being increased. In other words, the second control signal is a group control signal common between the communications device and one or more other communications devices, and the infrastructure equipment is configured to transmit the second control signal to each of the communications device and the one or more other communications devices.

Figure 12:
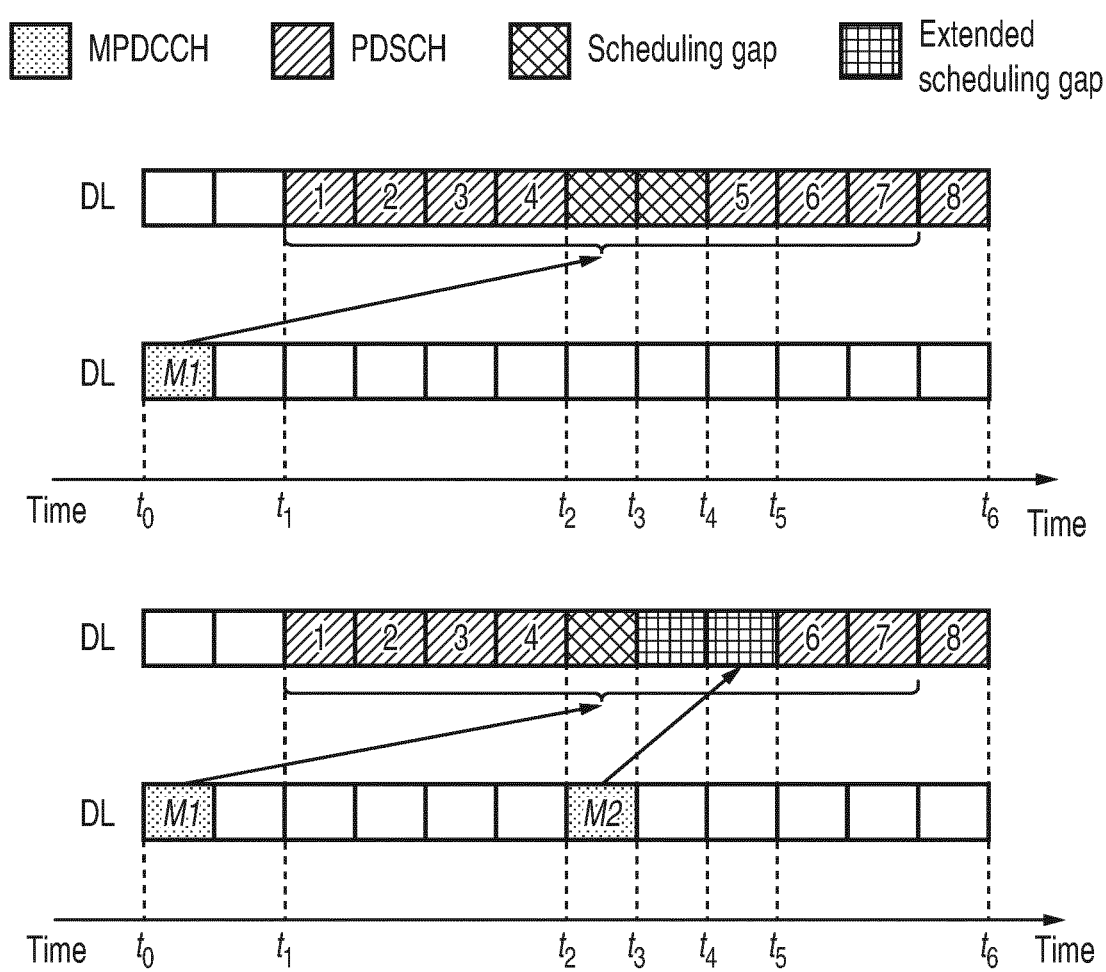
FIG. 12 shows an example of how the scheduling gap can be extended when there is a delay at a UE in decoding the MPDCCH in accordance with embodiments of the present technique.

The preceding paragraphs and referenced FIGS. 9 to 11 in this section describe methods of extending the scheduling gap. For the sake of conciseness, FIGS. 9 to 11 show an "instant" response to an MPDCCH (M2) that extends the scheduling gap (i.e. the UE is able to extend the scheduling gap in the subframe immediately following M2). It will be appreciated that there might be some delay in decoding such an MPDCCH and the dimensions of the scheduling gap and location of M2 within that scheduling gap will need to take account of such processing delays. An example of this shown in FIG. 12, which is equivalent to FIG. 9, but is based on the assumption that there is a one subframe delay in decoding the MPDCCH. In order to accommodate this decoding delay, the minimum duration of the scheduling gap is two subframes and the gap-extending MPDCCH M2 is constrained to occupy the first subframe of the scheduling gap. In this example shown by FIG. 12:

MPDCCH M2 is received between $t_2$ and $t_3$; and
MPDCCH M2 is decoded between $t_3$ and $t_4$, i.e. with a one subframe decoding delay.

At $t_4$, the UE understands that the scheduling gap has been extended, and thus skips decoding of transport block 5, as previously discussed with reference to FIG. 9.

Stopping Multi-TB Message During Scheduling Gap

In an arrangement of embodiments of the present technique, the multi-TB transmission to the UE (in the DL, via PDSCH) or from the UE (in the UL, via PUSCH) is stopped during the scheduling gap in response to signalling carried by an MPDCCH. In other words, the at least one change relating to the second plurality of transport blocks is that the infrastructure equipment is not going to transmit one or more of the second plurality of transport blocks indicated by the first control signal. It should be appreciated by those skilled in the art that another MPDCCH may in some implementations be then sent by an eNodeB indicating that the stopped multi-TB transmission is to be restarted at a later point.

There are various methods of stopping a transmission that are known in the prior art, such as the use of early termination signalling, where an explicit "STOP" signal is sent to the UE using an MPDCCH or other signal (such as an early termination signal that can be used within an uplink compensation gap). In the following implementations of the present arrangement of embodiments of the present technique, some novel methods of signalling early termination of the multi-TB transmission during the scheduling gap are described.

Figure 13:
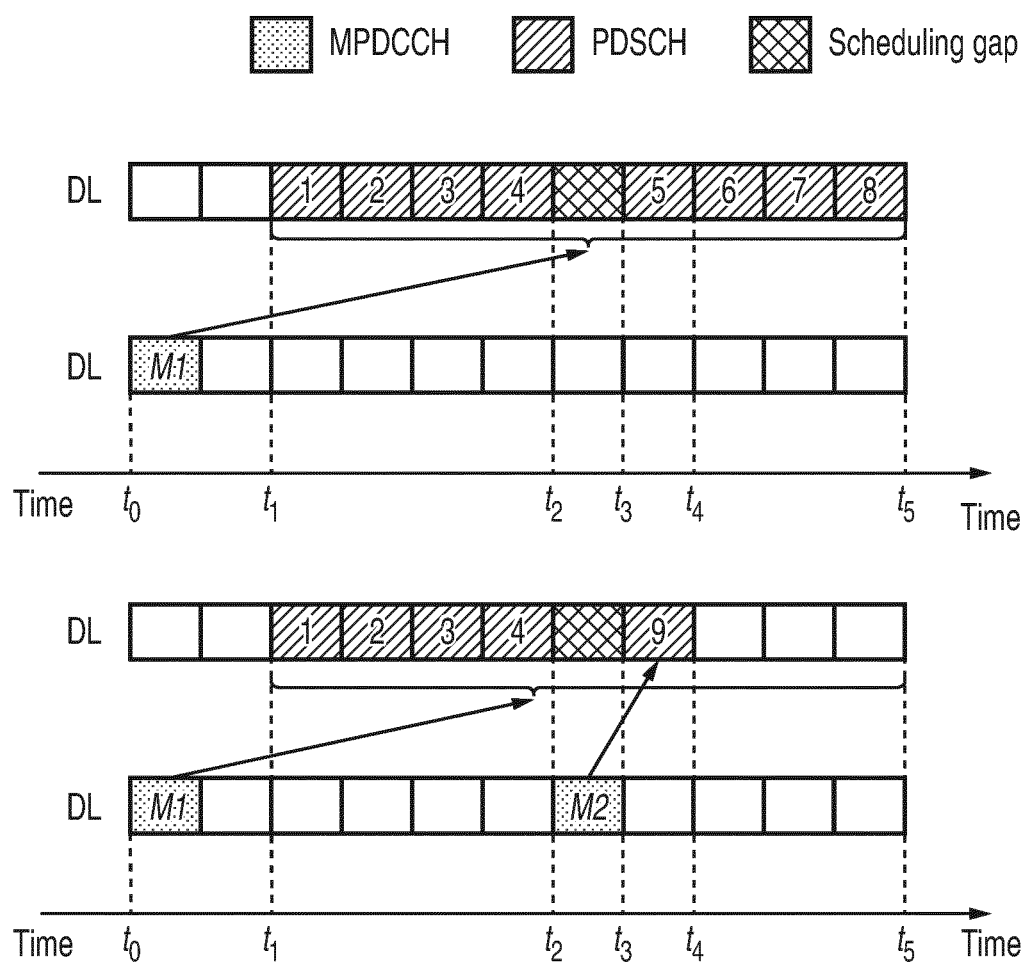
FIG. 13 shows an example of how a downlink grant received by a UE during the scheduling gap may schedule a new PDSCH and pre-empt the multi-TB transmission in accordance with embodiments of the present technique.

The eNB may schedule a DL grant to the UE that relates to a PDSCH that the eNB will transmit during the time period of the previously scheduled multi-TB transmission to the UE. This mode of operation can be used to pre-empt an ongoing DL transmission to the UE when data of higher priority needs to be transmitted to the UE. This is illustrated in FIG. 13, where the top part of FIG. 13 shows operation when there is no DL grant in the multi-TB scheduling gap and the bottom part of FIG. 13 shows operation when there is a DL grant. FIG. 13 shows that the UE receives an MPDCCH, M2, during the scheduling gap, between times $t_2$ and $t_3$, which schedules a PDSCH, "9", during the extent of the multi-TB transmission that follows the scheduling gap (PDSCH "9" is scheduled between times $t_3$ and $t_4$). The consequence of the UE being scheduled PDSCH "9" by an MPDCCH during the scheduling gap is that the remainder of the multi-TB transmission is cancelled—i.e. PDSCH 5, 6, 7, 8 from the multi-TB transmission are cancelled and PDSCH 9 is received by the UE instead. In this manner, PDSCH 5, 6, 7, 8 are pre-empted by PDSCH 9. In other words, the second control signal provides an indication that the infrastructure equipment is going to transmit a downlink signal to the communications device in at least a portion of the second set of downlink communications resources. Here, the downlink signal may be associated with a higher priority than the second plurality of transport blocks. It should be noted that if PDSCH 9 has a higher priority than PDSCH 5, 6, 7, 8, PDSCH 9 could be scheduled to have a more robust transport format than that applied to PDSCH 5, 6, 7, 8.

The eNB may schedule an UL grant to the UE that relates to a PUSCH that the UE will transmit during the time period of the previously scheduled multi-TB transmission from the UE. Again, this mode of operation can be used to pre-empt an ongoing UL transmission from the UE when the eNB determines that higher priority data should be transmitted by the UE. In other words, the second control signal provides an indication that the communications device is to transmit an uplink signal to the infrastructure equipment in a set of uplink communications resources of the wireless access interface, the set of uplink communications resources overlapping in time with at least a portion of the second set of downlink communications resources. Here, the uplink signal may be associated with a higher priority than the second plurality of transport blocks. This implementation is the UL counterpart of the implementation described in the paragraph above with reference to FIG. 13, and hence a skilled artisan will have no trouble understanding it from the description provided for the DL counterpart of FIG. 13.

Figure 14:
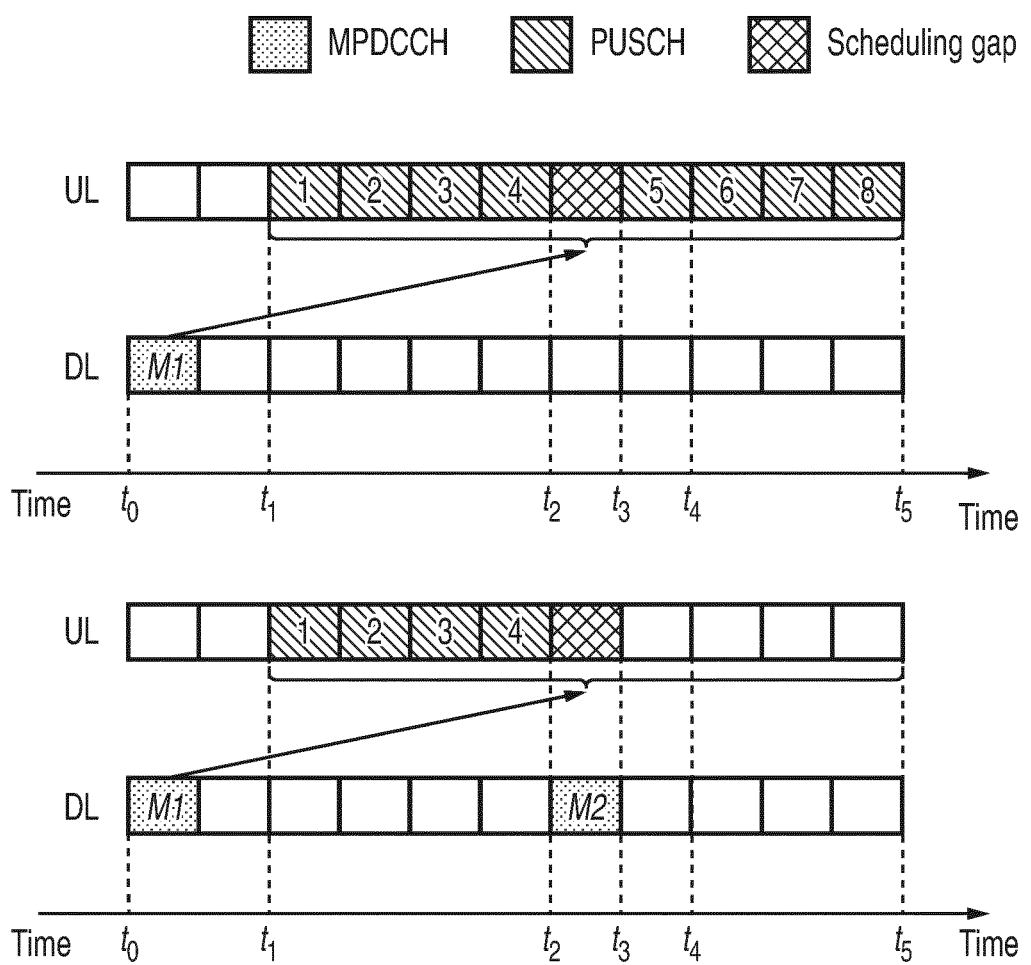
FIG. 14 shows an example of how Hybrid Automatic Repeat Request Acknowledgements (HARQ-ACK/NACKs) signalling during the scheduling gap may lead to early termination of the multi-TB transmission in accordance with embodiments of the present technique.

The eNB may signal a HARQ ACK/NACK message related to an ongoing UL multi-TB message to the UE. Early reception of this HARQ ACK/NACK feedback at the UE implicitly indicates that the multi-TB UL transmission is to be terminated by the UE. It should be appreciated by those skilled in the art that the HARQ ACK/NACK for a multi-TB transmission usually occurs following the multi-TB transmission, rather than during a scheduling gap in the middle of a multi-TB transmission. This implementation is illustrated in FIG. 14, the top part of which shows the UE being allocated a multi-TB PUSCH transmission with a scheduling gap between times $t_2$ and $t_3$. The lower part of FIG. 14 shows an MPDCCH, M2, carrying HARQ ACK/NACK signalling to the UE, being received during the scheduling gap. The HARQ ACK/NACK signalling relates to one or more of PUSCH 1, 2, 3, 4 (i.e. the PUSCH in the multi-TB allocation that preceded the scheduling gap). Reception of MPDCCH M2 with the HARQ ACK/NACK signalling causes the UE to cancel transmission of PUSCH 5, 6, 7, 8; i.e. the multi-TB PUSCH transmission is early-terminated by reception of an MPDCCH carrying HARQ ACK/NACK signalling during the multi-TB scheduling gap. In other words, the second control signal further comprises feedback indicating whether or not each of the first plurality of transport blocks were successfully received by the infrastructure equipment from the communications device. The second control signal may further indicate, if the feedback signal indicates that at least one of the first plurality of transport blocks was not successfully received by the infrastructure equipment, that the communications device is to retransmit the at least one of the first plurality of transport blocks that was not successfully received by the infrastructure equipment in at least a portion of the second set of uplink communications resources.

When the eNB terminates transmission of a DL multi-TB transmission (either using an explicit early termination signal or one of the implicit methods described above), in an implementation of the present arrangement of embodiments of the present technique, the UE responds with HARQ ACK/NACK feedback (which can be either carried on a Physical Uplink Control Channel (PUCCH) or a PUSCH), indicating which of the received PDSCHs are successfully decoded. It should be noted that the remaining PDSCHs after the termination can either be indicated as NACK or not represented at all in this HARQ ACK/NACK feedback. The resources to be used for the transmission of this HARQ ACK/NACK feedback could be determined by the UE in various ways, such as those described below with reference to FIG. 15 and FIG. 16.

Figure 15:
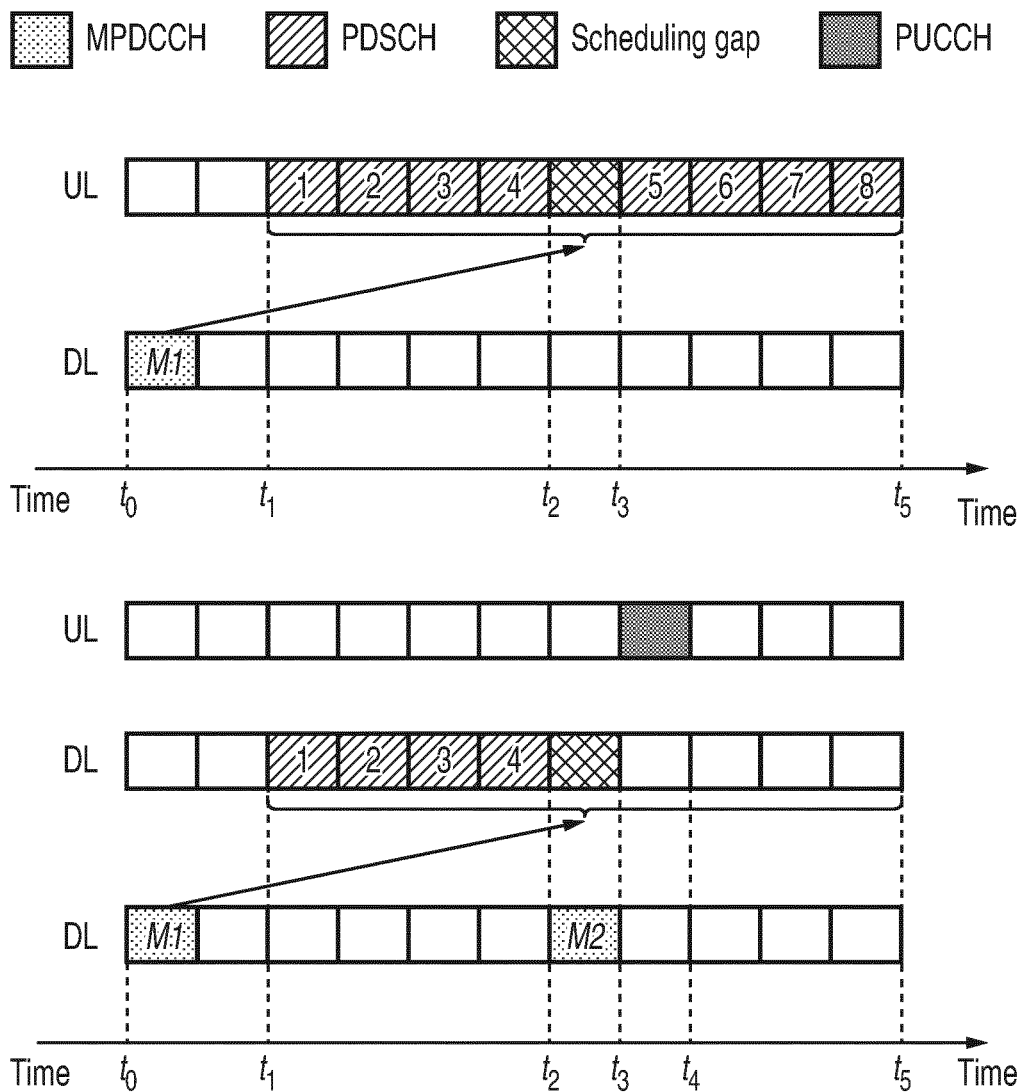
FIG. 15 shows an example of how early termination signalling may cause the UE to send HARQ-ACK/NACK feedback in accordance with embodiments of the present technique.

FIG. 15 shows an example of an implementation in which the UE sends HARQ ACK/NACK feedback signalling to the eNB in response to receiving early termination signalling during the scheduling gap. The top part of FIG. 15 shows the original scheduling of multi-TB PDSCH with a scheduling gap. The lower part of FIG. 15 shows the UE receiving early termination signalling during the scheduling gap via an MPDCCH, M2. This MPDCCH M2 could cause early termination via one of the above described implementations in this section or via one of the methods of signalling early termination that are known from legacy systems. In response to the early termination signalling, the UE cancels reception of PDSCH 5, 6, 7, 8 (i.e. the PDSCH after the scheduling gap). The UE also sends a PUCCH containing HARQ ACK/NACK signalling relating to PDSCH transmissions 1, 2, 3, 4 within a PUCCH between times t3 and t4. The physical resources used for the PUCCH may be signalled within MPDCCH M2 (e.g. MPDCCH M2 can indicate the physical resource blocks and subcarriers to be used for the PUCCH transmission). In other words, the second control signal indicates that the communications device is to terminate reception of at least one of the second plurality of transport blocks and in response the communications devices transmits a feedback signal to the infrastructure equipment in a set of uplink communications resources of the wireless access interface, the feedback signal indicating, for each of the first plurality of transport blocks, whether or not the each of the first plurality of transport blocks was successfully received by the communications device from the infrastructure equipment. Alternatively, the second control signal may indicate that the communications device is to transmit a feedback signal to the infrastructure equipment in a set of uplink communications resources of the wireless access interface (which then terminates reception by the communications device of at least one of the second plurality of transport blocks), the feedback signal indicating, for each of the first plurality of transport blocks, whether or not the each of the first plurality of transport blocks was successfully received by the communications device from the infrastructure equipment. The set of uplink communications resources may overlap in time with at least a portion of the second set of downlink communications resources, or they may be entirely separate in time.

Figure 16:
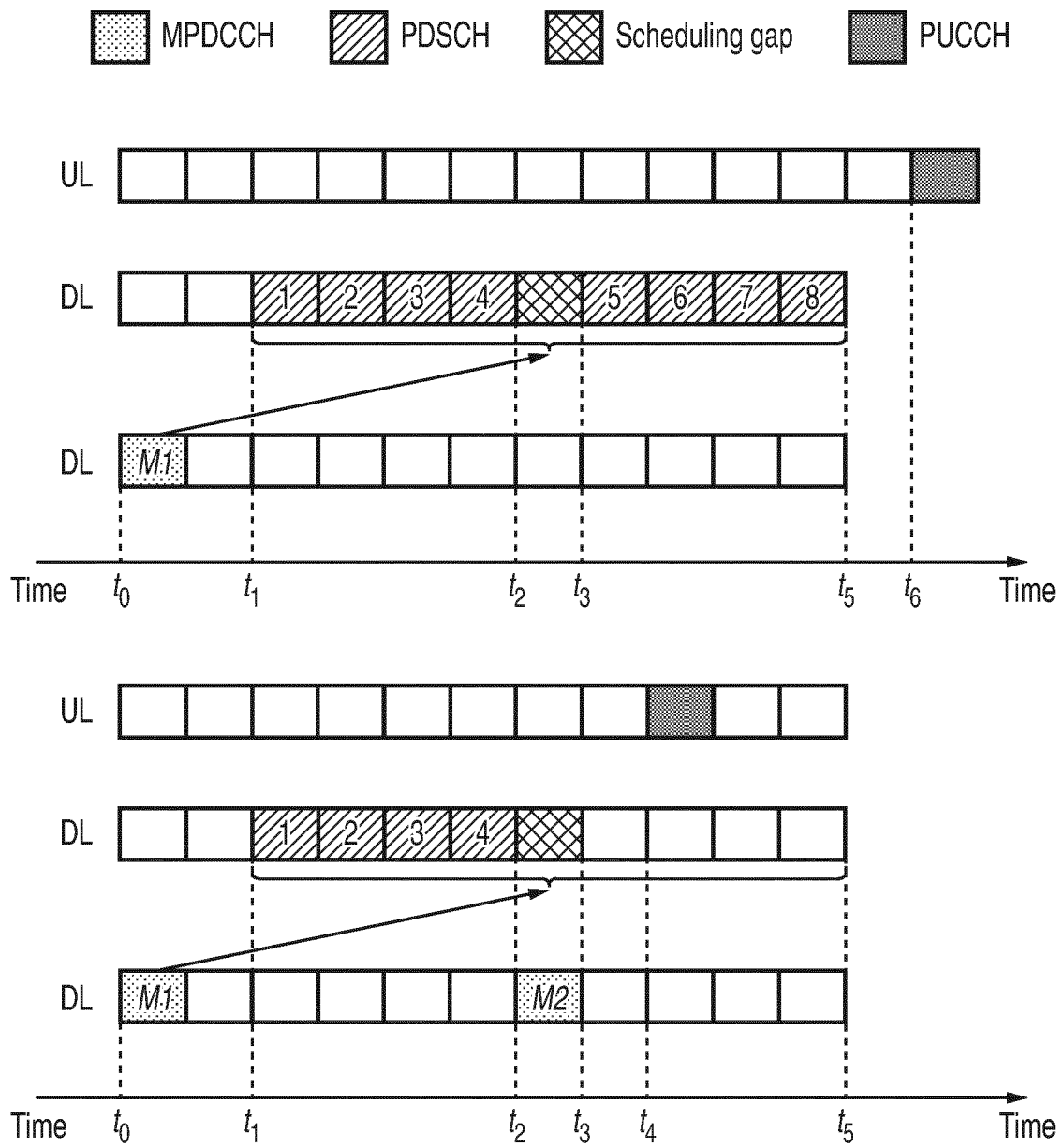
FIG. 16 shows an example of how a UE may implicitly derive resources used for a Physical Uplink Control Channel (PUCCH) transmission where the multi-TB transmission is terminated during the scheduling gap in accordance with embodiments of the present technique.

In a variation to the above implementation described with reference to FIG. 15, the resources for the PUCCH are determined implicitly. The original multi-TB transmission has an associated PUCCH transmission, which follows the final transport block of the multi-TB transmission. In this implementation, the timing of the PUCCH is brought forward by the amount of resource that is not used for the cancelled transmissions. An example is shown in FIG. 16. The top part of FIG. 16 shows the originally scheduled multi-TB transmission. The HARQ ACK/NACK for this multi-TB transmission is scheduled to be transmitted in a PUCCH two subframes following the last subframe used for the multi-TB transmission, i.e. the PUCCH is scheduled to be transmitted at time $t_6$. The lower part of FIG. 16 shows the case where an MPDCCH during the scheduling gap, M2, terminates the multi-TB transmission during the scheduling gap. Since the multi-TB transmission was terminated 4 subframes early, the PUCCH (carrying HARQ ACK/NACK for the first four transport blocks) is transmitted 4 subframes early at time $t_4$. In other words, the second control signal indicates that the communications device is to transmit a feedback signal to the infrastructure equipment, the feedback signal indicating, for each of the first plurality of transport blocks, whether or not the each of the first plurality of transport blocks was successfully received by the communications device from the infrastructure equipment, wherein the feedback signal is to be transmitted in a set of uplink communications resources of the wireless access interface associated with the second set of downlink resources(which then terminates reception by the communications device of at least one of the second plurality of transport blocks). Here, the set of uplink communications resources may be shifted forward in time in response to the second control signal indicating that the communications device is to transmit the feedback signal. Alternatively, the second control signal indicates that the communications device is to terminate reception of at least one of the second plurality of transport blocks and in response the communications devices transmits a feedback signal to the infrastructure equipment in a set of uplink communications resources of the wireless access interface associated with the second set of downlink resources. Again, the set of uplink communications resources may be shifted forward in time in response to the second control signal indicating that the communications device is to transmit the feedback signal.

It should be appreciated by those skilled in the art that in any of the implementations of the present arrangement of embodiments of the present technique described in this section above with reference to FIGS. 13 to 16, early termination signalling does not necessarily terminate all transmissions/receptions after the scheduling gap, but could just terminate some of the transmissions/receptions. For example, referring to FIG. 14, early termination signalling could terminate transmission of PUSCH 5, but still allow the transmission of PUSCH 6, 7, 8.

It should be further appreciated by those skilled in the art that FIGS. 13 to 16 above show example timings between physical channels, e.g. example timings between PDSCH and PUCCH. The timings actually employed in some implementations may be different to the timings shown in such figures, as will be evident to a skilled artisan. For example, FIG. 16 shows a time gap between PDSCH and PUCCH of a single timeslot, whereas the typical timing between PDSCH and PUCCH (ignoring timing advance) is 3 timeslots. The specific timing between physical channels is not relevant to the inventive contribution of embodiments of the present technique, as those skilled in the art would readily appreciate.

Change of Physical Resources

As discussed previously, with reference to FIG. 7, the channel conditions can change during an ongoing multi-TB transmission. Hence, in an arrangement of embodiments of the present technique, it is desirable to adapt the multi-TB transmission (by making use of the scheduling gap) during the ongoing multi-TB transmission. In other words, the at least one change relating to the second plurality of transport blocks is a change in at least one communications parameter of the second set of downlink communications resources indicated by the first control signal.

During the scheduling gap, the eNB can send an MPDCCH to the UE that changes the physical resources used by the multi-TB transmission. In other words, the at least one communications parameter is the physical resources of the wireless access interface forming the second set of downlink communications resources. For example, when the UE transmits multi-TB PUSCH to the eNB, if the PUSCH is received in poor channel conditions, the eNB can send an MPDCCH with new physical resources to be used for the PUSCH after the scheduling gap. The eNB can choose the physical resources to be used in several different ways:

When PUSCH is frequency hopped, if one of the frequencies that the PUSCH is hopped to exhibits poor channel conditions and the other frequency exhibits good channel conditions, the eNB sends an MPDCCH that stops transmission on the frequency with poor channel conditions and the transmission is continued on the other (good) frequency alone;

When the UE sends SRS (sounding reference signals) in addition to PUSCH, the eNB takes measurements on the SRS and based on these measurements chooses physical resources for the part of the PUSCH following the scheduling gap; and/or When channel conditions are poor on the frequency on which PUSCH is being received, the eNB makes a blind decision on a new frequency on which PUSCH should be transmitted. This decision could be made on the basis of a philosophy that some other frequency cannot be worse than the bad frequency that is currently being used by PUSCH.

If the UE observes poor channel conditions on the narrowbands that it is monitoring (e.g. on the narrowband on which PDSCH is received), it sends a PUCCH to the eNB indicating those narrowbands for which channel conditions are poor. In other words, the infrastructure equipment is configured to receive measurement information from the communications device indicating that a quality of signals received by the communications device within at least part of the first set of downlink communications resources and/or at least part of the second set of downlink communications resources is below a threshold quality, and based on the received measurement information, to transmit the second control signal. The report on PUCCH can take the form of a CSI report (channel state information report).

Figure 17:
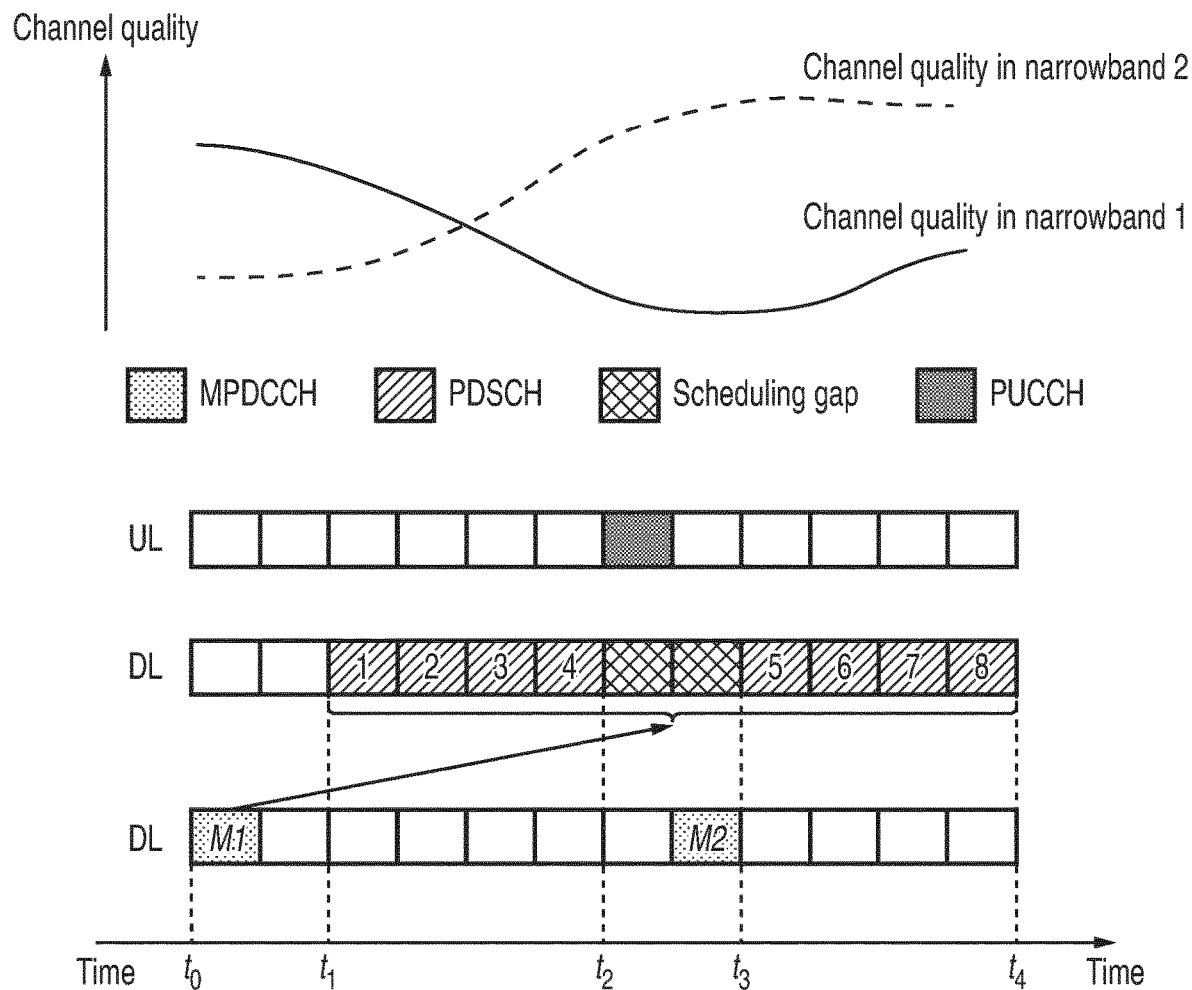
FIG. 17 shows an example of how a UE may transmit a Channel State Information (CSI) report during the scheduling gap in accordance with embodiments of the present technique.

FIG. 17 shows an example of this functionality. As shown in FIG. 17, the UE monitors two narrowbands (narrowband 1 and narrowband 2), for example due to frequency hopping of the PDSCH that it is receiving. During the scheduling gap, the UE observes that channel conditions on narrowband 1 are significantly worse than channel conditions on narrowband 2. This triggers the UE to send a CSI report on PUCCH during the scheduling gap indicating that channel conditions on narrowband 2 are significantly better than on narrowband 1. In response to this CSI report, the eNB sends a second MPDCCH, M2, that changes the physical resources (e.g. frequency) or transport format (e.g. MCS) for the portion of the multi-TB transmission that follows the scheduling gap. It should be noted that a longer scheduling gap is shown in this figure (compared to earlier figures) to allow the UE to send a PUCCH and receive a subsequent MPDCCH).

Figure 18:
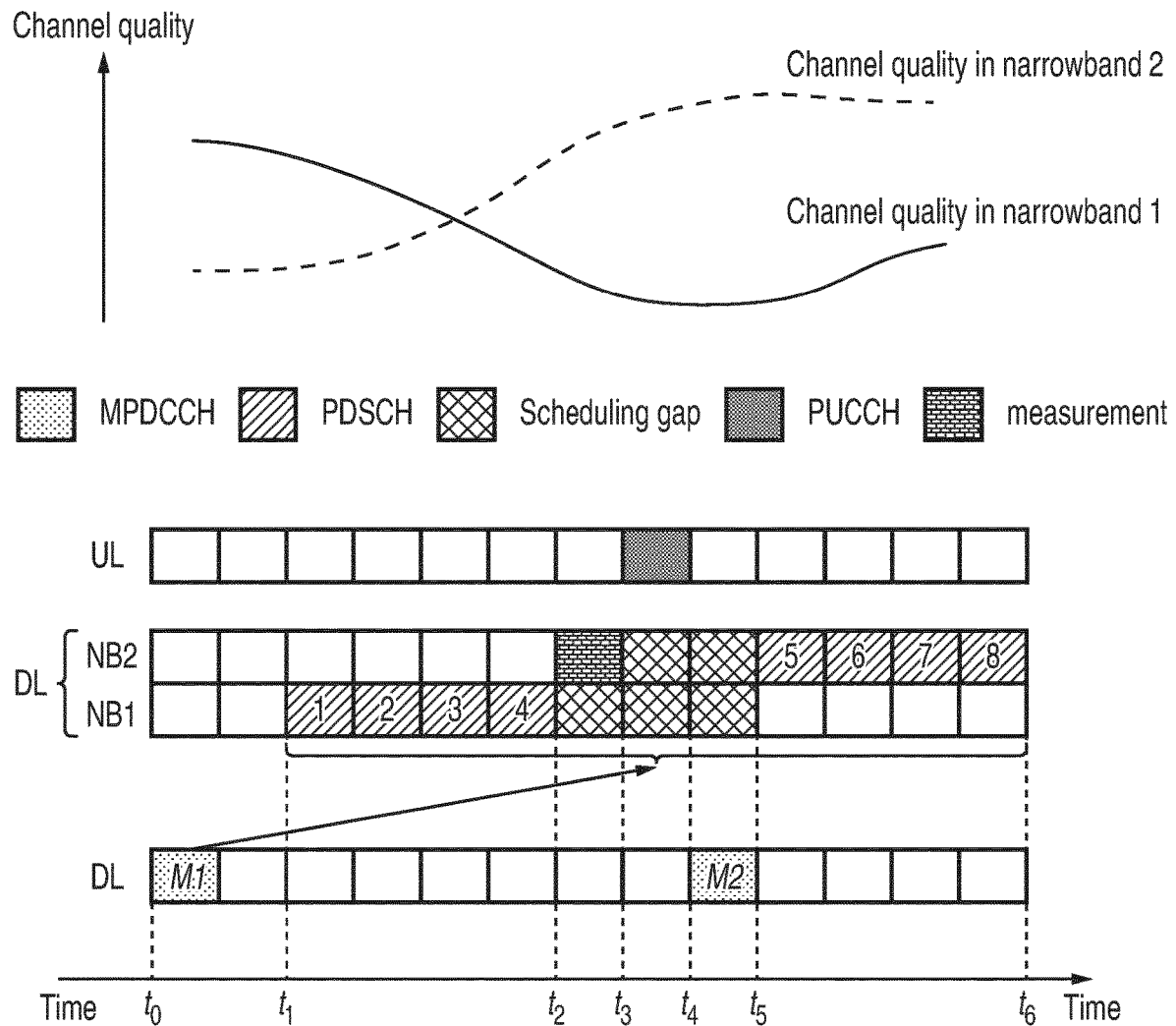
FIG. 18 shows an example of how a UE may perform measurements during the scheduling gap and transmit a CSI report based on these measurements in accordance with embodiments of the present technique.

In a related implementation to that described in the paragraph above, if the UE observes poor channel conditions on a narrowband that it is monitoring, during the scheduling gap it performs measurements on other narrowbands and then sends a CSI report (e.g. via PUCCH) to the eNB. The eNB can then send a second MPDCCH to the UE updating the physical resources to be used for the multi-TB transmission that follows the scheduling gap. In other words, the measurement information further comprises an indication of a quality of signals received by the communications device within downlink resources of the wireless access interface other than the first set of downlink communications resources and the second set of downlink communications resources, and the infrastructure equipment is configured to indicate, in the second control signal, that the infrastructure equipment is going to transmit the second plurality of transport blocks in a set of downlink communications resources of the wireless access interface based on the quality that was indicated in the measurement information instead of in the second set of downlink communications resources. This mode of operation is shown in FIG. 18, which shows a multi-TB PDSCH scheduled to the UE at time $t_0$. During the reception of the multi-TB PDSCH, the UE observes that the channel conditions on narrowband 1 ("NB1"), on which the PDSCH is being received, are poor. Hence, during the scheduling gap, at time $t_2$, the UE performs a measurement on narrowband 2 ("NB2"). Since the channel conditions on NB2 are better than those on NB1, the UE sends a CSI report in a PUCCH at time $t_3$. In response, at time $t_4$, the eNB changes the physical resources used by the multi-TB PDSCH, such that following the scheduling gap the UE uses narrowband 2 for the multi-TB PDSCH following the scheduling gap.

It should be appreciated that, in at least some implementations, the scheduling gap is dimensioned to allow the UE to perform channel measurements during the scheduling gap, and to potentially send a PUCCH. Hence, with reference to FIG. 18, the potential PUCCH within the scheduling gap is timed to occur at a time that allows the UE to perform a measurement between $t_2$ and $t_3$ and to prepare the PUCCH for transmission.

In an implementation related to those described in the paragraphs above with reference to FIGS. 17 and 18, the UE indicates a CSI report in response to one of the PDSCH preceding the scheduling gap failing a Cyclic Redundancy Check (CRC)—i.e. the PDSCH is NACKed. In other words, the measurement information is received by the infrastructure equipment in response to the communications device not successfully receiving at least one of the first plurality of transport blocks. The CSI report can either be related to the narrowbands that the UE is monitoring or the NACK status can trigger the UE to perform measurements on narrowbands.

Figure 19:
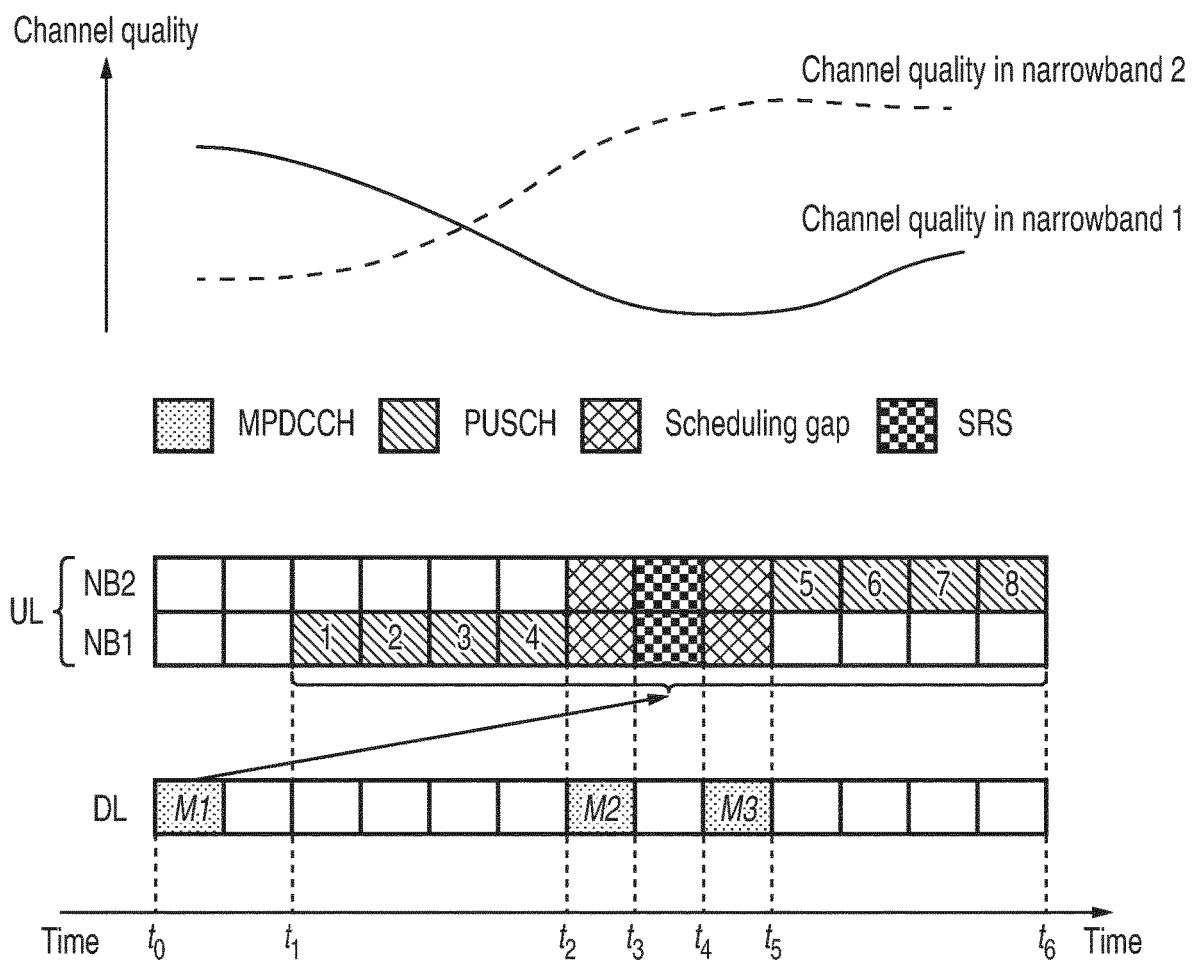
FIG. 19 shows an example of how a UE may transmit Sounding Reference Signals (SRS) in response to receiving a NACK relating to a Physical Uplink Shared Channel (PUSCH) transmission by the UE to an eNB.

In another implementation, if PUSCH is received as NACK by the eNB, the eNB sends an MPDCCH to the UE instructing the UE to send an SRS report. The UE sends the SRS report, allowing the eNB to determine a better narrowband for the UE to transmit its PUSCH on. The eNB then sends another MPDCCH to the UE with new physical resources (e.g. using the better narrowband) for the UE to use following the scheduling gap. FIG. 19 shows an example of operation according to this implementation. The UE is initially scheduled to transmit PUSCH on narrowband 1. One of the PUSCHs prior to the scheduling gap is incorrectly received by the eNB (the PUSCH is NACKed). In response to this NACK, the eNB sends an MPDCCH, M2, at time $t_2$, instructing the UE to send an SRS at time $t_3$. In other words, the infrastructure equipment is configured to transmit the second control signal in response to determining that at least one of the first plurality of transport blocks was not successfully received from the communications device, the second control signal further indicating that the communications device should transmit sounding reference signals to the infrastructure equipment. The SRS transmission occupies more than one narrowband, allowing the eNB to determine that narrowband 2 would be a preferable narrowband for the continuation of the PUSCH transmission. Hence at time $t_4$, the eNB sends an MPDCCH, M3, to the UE, instructing the UE to use narrowband 2 for the portion of the multi-TB transmission that follows the scheduling gap. In other words, the infrastructure equipment is configured to receive the sounding reference signals from the communications device, to perform measurements on the received sounding reference signals, and to transmit a third control signal to the communications device, the third control signal indicating that the communications device is to transmit the second plurality of transport blocks in a set of uplink communications resources of the wireless access interface instead of in the second set of uplink communications resources based on the measurements performed on the sounding reference signals. It should be appreciated that FIG. 19 is an example to illustrate the implementation and that in a typical MTC operation the UE may only be able to transmit SRS in one narrowband at a time. For the case in FIG. 19, the UE may transmit SRS in NB1 and NB2 in different subframes.

The above implementations of the present arrangement of embodiments of the present technique have considered changing the narrowband (or other physical resources) in response to observing poor channel conditions. In another implementation, in response to a deterioration or improvement of DL channel conditions, the UE can send a CSI report to the eNB indicating such a change. The eNB then changes the MCS or number of repetitions used for the remainder of the multi-TB PDSCH that follows the scheduling gap. In other words the at least one communications parameter is a transport format (e.g. the MCS) with which the second plurality of transport blocks are transmitted by the infrastructure equipment in the second set of downlink communications resources, or alternatively or additionally, the at least one communications parameter is a number of repetitions with which the second plurality of transport blocks are transmitted by the infrastructure equipment in the second set of downlink communications resources.

In an equivalent implementation in the UL, if the eNB observes a change in UL channel conditions during the scheduling gap, it transmits an MPDCCH to the UE instructing it of a change in the MCS or number of repetitions to be applied to a multi-TB PUSCH transmission. In other words, the at least one communications parameter is a transport format with which the communications device is to transmit the second plurality of transport blocks in the second set of downlink communications resources, or alternatively or additionally, the at least one communications parameter is a number of repetitions with which the communications device is to transmit the second plurality of transport blocks in the second set of downlink communications resources.

Previous arrangements of embodiments of the present technique have described the use of a single second control signal that indicates a modification of a multi-TB transmission. It will be appreciated that there may in general be further control signals during the scheduling gap. For example, a second control signal could indicate an extension of the scheduling gap and during that extended scheduling gap, there may be reason to further extend the scheduling gap (e.g. if more data needs to be scheduled to another UE) through the use of a third control signal. In other words, the infrastructure equipment is configured to transmit, to the communications device during the scheduling gap after the second control signal, a third control signal providing an indication of at least one further change relating to the second plurality of transport blocks. Indeed, in some arrangements of embodiments of the present technique, reception of the second control signal can trigger the UE to monitor for a third control signal, where the format of the third control signal may be different to that of the second control signal, or where the communications resources used by the third control signal may be different to those used by the second control signal, or where the periodicity of monitoring for the third control signal may be different to that of the second control signal.

Flow Chart Representation

Figure 20A:
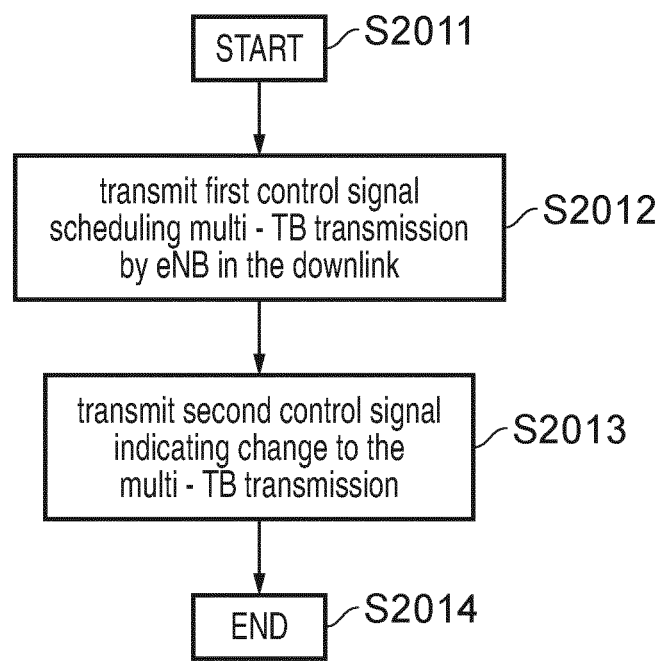
FIG. 20A shows a first flow diagram illustrating a process of communications in a communications system in accordance with embodiments of the present technique.

FIG. 20A shows a flow diagram illustrating a first example process of communications in a communications system in accordance with embodiments of the present technique. The process shown by FIG. 20A is a method of operating an infrastructure equipment forming part of a wireless communications network and configured to transmit data to and/or receive data from a communications device.

The method begins in step S2011. The method comprises, in step S2012, transmitting, to a communications device, a first control signal providing an indication of a set of downlink communications resources of the wireless access interface in which the infrastructure equipment is going to transmit a plurality of transport blocks to the communications device, wherein the plurality of transport blocks comprises a first plurality of transport blocks that are to be transmitted in a first set of downlink communications resources and a second plurality of transport blocks that are to be transmitted in a second set of downlink communications resources, the first set of downlink communications resources and the second set of downlink communications resources being separated in time by a scheduling gap formed by a third set of downlink communications resources of the wireless access interface. In step S2013, the process comprises transmitting, to the communications device during the scheduling gap, a second control signal providing an indication of at least one change relating to the second plurality of transport blocks. The method ends in step S2014.

Figure 20B:
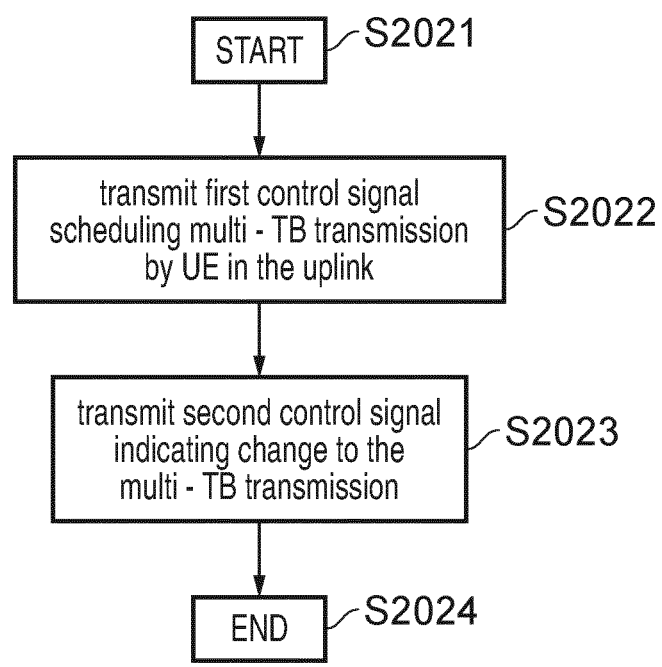
FIG. 20B shows a second flow diagram illustrating a process of communications in a communications system in accordance with embodiments of the present technique.

FIG. 20B shows a flow diagram illustrating a second example process of communications in a communications system in accordance with embodiments of the present technique. The process shown by FIG. 20B is a method of operating an infrastructure equipment forming part of a wireless communications network and configured to transmit data to and/or receive data from a communications device.

The method begins in step S2021. The method comprises, in step S2022, transmitting, to a communications device, a first control signal providing an indication of a set of uplink communications resources of the wireless access interface in which the communications device is to transmit a plurality of transport blocks to the infrastructure equipment, wherein the plurality of transport blocks comprises a first plurality of transport blocks that are to be transmitted in a first set of uplink communications resources and a second plurality of transport blocks that are to be transmitted in a second set of uplink communications resources, the first set of uplink communications resources and the second set of uplink communications resources being separated in time by a scheduling gap formed by a third set of uplink communications resources of the wireless access interface. In step S2023, the process comprises transmitting, to the communications device during the scheduling gap, a second control signal providing an indication of at least one change relating to the second plurality of transport blocks. The method ends in step S2024.

Those skilled in the art would appreciate that the methods shown by FIGS. 20A and 20B may be adapted in accordance with embodiments of the present technique. For example, other intermediate steps may be included in these methods, or the steps may be performed in any logical order.

Though embodiments of the present technique have been described largely by way of the example communications systems shown in FIGS. 8A and 8B, and in accordance with the examples of FIGS. 9 to 19, it would be clear to those skilled in the art that they could be equally applied to other systems to those described herein.

It should be appreciated by those skilled in the art that, although the examples of FIGS. 9 to 19 show a multi-TB transmission in either one of the downlink or the uplink, these examples could equally apply to multi-TB transmissions in the other of the downlink or the uplink. Thus, the scope of the present application is not limited to those examples as shown in FIGS. 9 to 19.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. An infrastructure equipment forming part of a wireless communications network, the infrastructure equipment configured to transmit data or receive data and comprising transceiver circuitry configured to transmit signals and receive signals via a wireless access interface provided by the wireless communications network, and controller circuitry configured in combination with the transceiver circuitry to transmit, to a communications device, a first control signal providing an indication of a set of downlink communications resources of the wireless access interface in which the infrastructure equipment is going to transmit a plurality of transport blocks to the communications device, wherein the plurality of transport blocks comprises a first plurality of transport blocks that are to be transmitted in a first set of downlink communications resources and a second plurality of transport blocks that are to be transmitted in a second set of downlink communications resources, the first set of downlink communications resources and the second set of downlink communications resources being separated in time by a scheduling gap formed by a third set of downlink communications resources of the wireless access interface, and to transmit, to the communications device during the scheduling gap, a second control signal providing an indication of at least one change relating to the second plurality of transport blocks.

Paragraph 2. An infrastructure equipment according to Paragraph 1, wherein the at least one change relating to the second plurality of transport blocks is that the scheduling gap is extended in time.

Paragraph 3. An infrastructure equipment according to Paragraph 2, wherein the scheduling gap is extended in time by an amount indicated by the second control signal.

Paragraph 4. An infrastructure equipment according to Paragraph 2 or Paragraph 3, wherein the scheduling gap is extended in time by an amount indicated in a Radio Resource Control, RRC, signalling message transmitted by the infrastructure equipment to the communications device.

Paragraph 5. An infrastructure equipment according to any of Paragraphs 2 to 4, wherein the scheduling gap is to be extended by the infrastructure equipment not transmitting at least one of the second plurality of transport blocks, wherein the first control signal had indicated that the infrastructure equipment was going to transmit the at least one of the second plurality of transport blocks before the others of the second plurality of transport blocks.

Paragraph 6. An infrastructure equipment according to any of Paragraphs 2 to 5, wherein the second control signal indicates that the scheduling gap is to be extended by shifting the second set of downlink communications resources in time.

Paragraph 7. An infrastructure equipment according to any of Paragraphs 2 to 6, wherein the second control signal indicates that the scheduling gap is to be extended by indicating that the infrastructure equipment is going to transmit at least one of the second plurality of transport blocks after the others of the second plurality of transport blocks, wherein the first control signal had indicated that the infrastructure equipment was going to transmit the at least one of the second plurality of transport blocks before the others of the second plurality of transport blocks.

Paragraph 8. An infrastructure equipment according to any of Paragraphs 2 to 7, wherein the second control signal is a group control signal common between the communications device and one or more other communications devices, and the infrastructure equipment is configured to transmit the second control signal to each of the communications device and the one or more other communications devices.

Paragraph 9. An infrastructure equipment according to any of Paragraphs 1 to 8, wherein the at least one change relating to the second plurality of transport blocks is that the infrastructure equipment is not going to transmit one or more of the second plurality of transport blocks indicated by the first control signal.

Paragraph 10. An infrastructure equipment according to Paragraph 9, wherein the second control signal provides an indication that the infrastructure equipment is going to transmit a downlink signal to the communications device in at least a portion of the second set of downlink communications resources.

Paragraph 11. An infrastructure equipment according to Paragraph 10, wherein the downlink signal is associated with a higher priority than the second plurality of transport blocks.

Paragraph 12. An infrastructure equipment according to any of Paragraphs 9 to 11, wherein the second control signal provides an indication that the communications device is to transmit an uplink signal to the infrastructure equipment in a set of uplink communications resources of the wireless access interface.

Paragraph 13. An infrastructure equipment according to Paragraph 12, wherein the uplink signal is associated with a higher priority than the second plurality of transport blocks.

Paragraph 14. An infrastructure equipment according to any of Paragraphs 9 to 13, wherein the second control signal indicates that the communications device is to transmit a feedback signal to the infrastructure equipment in a set of uplink communications resources of the wireless access interface, the feedback signal indicating, for each of the first plurality of transport blocks, whether or not the each of the first plurality of transport blocks was successfully received by the communications device from the infrastructure equipment.

Paragraph 15. An infrastructure equipment according to any of Paragraphs 9 to 14, wherein the second control signal indicates that the communications device is to terminate reception of at least one of the second plurality of transport blocks, and in response the infrastructure equipment is configured to receive a feedback signal from the communications device in a set of uplink communications resources of the wireless access interface, the feedback signal indicating, for each of the first plurality of transport blocks, whether or not the each of the first plurality of transport blocks was successfully received by the communications device from the infrastructure equipment.

Paragraph 16. An infrastructure equipment according to any of Paragraphs 9 to 15, wherein the second control signal indicates that the communications device is to transmit a feedback signal to the infrastructure equipment, the feedback signal indicating, for each of the first plurality of transport blocks, whether or not the each of the first plurality of transport blocks was successfully received by the communications device from the infrastructure equipment, wherein the feedback signal is to be transmitted in a set of uplink communications resources of the wireless access interface associated with the second set of downlink resources.

Paragraph 17. An infrastructure equipment according to any of Paragraphs 9 to 16, wherein the second control signal indicates that the communications device is to terminate reception of at least one of the second plurality of transport blocks, and in response the infrastructure equipment is configured to receive a feedback signal from the communications device, the feedback signal indicating, for each of the first plurality of transport blocks, whether or not the each of the first plurality of transport blocks was successfully received by the communications device from the infrastructure equipment, wherein the feedback signal is to be transmitted in a set of uplink communications resources of the wireless access interface associated with the second set of downlink resources.

Paragraph 18. An infrastructure equipment according to Paragraph 16 or Paragraph 17, wherein the infrastructure equipment is configured to determine that the set of uplink communications resources are shifted forward in time in response to the second control signal indicating that the communications device is to transmit the feedback signal.

Paragraph 19. An infrastructure equipment according to any of Paragraphs 1 to 18, wherein the at least one change relating to the second plurality of transport blocks is a change in at least one communications parameter of the second set of downlink communications resources indicated by the first control signal.

Paragraph 20. An infrastructure equipment according to Paragraph 19, wherein the at least one communications parameter is the physical resources of the wireless access interface forming the second set of downlink communications resources.

Paragraph 21. An infrastructure equipment according to Paragraph 20, wherein the infrastructure equipment is configured
 to receive measurement information from the communications device indicating that a quality of signals received by the communications device within at least part of the first set of downlink communications resources and/or at least part of the second set of downlink communications resources is below a threshold quality, and
 based on the received measurement information, to transmit the second control signal.

Paragraph 22. An infrastructure equipment according to Paragraph 21, wherein the measurement information further comprises an indication of a quality of signals received by the communications device within downlink resources of the wireless access interface other than the first set of downlink communications resources and the second set of downlink communications resources, and the infrastructure equipment is configured to indicate, in the second control signal, that the infrastructure equipment is going to transmit the second plurality of transport blocks in a set of downlink communications resources of the wireless access interface based on the quality that was indicated in the measurement information instead of in the second set of downlink communications resources.

Paragraph 23. An infrastructure equipment according to Paragraph 21 or Paragraph 22, wherein the measurement information is received by the infrastructure equipment in response to the communications device not successfully receiving at least one of the first plurality of transport blocks.

Paragraph 24. An infrastructure equipment according to any of Paragraphs 19 to 23, wherein the at least one communications parameter is a transport format with which the second plurality of transport blocks are transmitted by the infrastructure equipment in the second set of downlink communications resources.

Paragraph 25. An infrastructure equipment according to any of Paragraphs 19 to 24, wherein the at least one communications parameter is a number of repetitions with which the second plurality of transport blocks are transmitted by the infrastructure equipment in the second set of downlink communications resources.

Paragraph 26. An infrastructure equipment according to any of Paragraphs 1 to 25, wherein the infrastructure equipment is configured to transmit, to the communications device during the scheduling gap after the second control signal, a third control signal providing an indication of at least one further change relating to the second plurality of transport blocks.

Paragraph 27. A method of operating an infrastructure equipment forming part of a wireless communications network, the infrastructure equipment configured to transmit data or receive data, the method comprising
    transmitting, to a communications device, a first control signal providing an indication of a set of downlink communications resources of the wireless access interface in which the infrastructure equipment is going to transmit a plurality of transport blocks to the communications device, wherein the plurality of transport blocks comprises a first plurality of transport blocks that are to be transmitted in a first set of downlink communications resources and a second plurality of transport blocks that are to be transmitted in a second set of downlink communications resources, the first set of downlink communications resources and the second set of downlink communications resources being separated in time by a scheduling gap formed by a third set of downlink communications resources of the wireless access interface, and
    transmitting, to the communications device during the scheduling gap, a second control signal providing an indication of at least one change relating to the second plurality of transport blocks.

Paragraph 28. Circuitry for an infrastructure equipment forming part of a wireless communications network, the infrastructure equipment configured to transmit data or receive data and comprising
    transceiver circuitry configured to transmit signals and receive signals via a wireless access interface provided by the wireless communications network, and
    controller circuitry configured in combination with the transceiver circuitry
    to transmit, to a communications device, a first control signal providing an indication of a set of downlink communications resources of the wireless access interface in which the infrastructure equipment is going to transmit a plurality of transport blocks to the communications device, wherein the plurality of transport blocks comprises a first plurality of transport blocks that are to be transmitted in a first set of downlink communications resources and a second plurality of transport blocks that are to be transmitted in a second set of downlink communications resources, the first set of downlink communications resources and the second set of downlink communications resources being separated in time by a scheduling gap formed by a third set of downlink communications resources of the wireless access interface, and
    to transmit, to the communications device during the scheduling gap, a second control signal providing an indication of at least one change relating to the second plurality of transport blocks.

Paragraph 29. A communications device configured to transmit data or receive data, the communications device comprising
    transceiver circuitry configured to transmit signals and receive signals via a wireless access interface, and
    controller circuitry configured in combination with the transceiver circuitry
    to receive a first control signal providing an indication of a set of downlink communications resources of the wireless access interface in which the communications device is to receive a plurality of transport blocks, wherein the plurality of transport blocks comprises a first plurality of transport blocks that are to be received in a first set of downlink communications resources and a second plurality of transport blocks that are to be received in a second set of downlink communications resources, the first set of communications resources and the second set of communications resources being separated in time by a scheduling gap formed by a third set of communications resources of the wireless access interface, and
    to receive, during the scheduling gap, a second control signal indicating at least one change relating to the second plurality of transport blocks.

Paragraph 30. A method of operating a communications device configured to transmit data to or receive data from an infrastructure equipment of a wireless communications network, the method comprising
    receiving a first control signal providing an indication of a set of downlink communications resources of the wireless access interface in which the communications device is to receive a plurality of transport blocks, wherein the plurality of transport blocks comprises a first plurality of transport blocks that are to be received in a first set of downlink communications resources and a second plurality of transport blocks that are to be received in a second set of downlink communications resources, the first set of communications resources and the second set of communications resources being separated in time by a scheduling gap formed by a third set of communications resources of the wireless access interface, and
    receiving, during the scheduling gap, a second control signal indicating at least one change relating to the second plurality of transport blocks.

Paragraph 31. Circuitry for a communications device configured to transmit data or receive data, the communications device comprising
    transceiver circuitry configured to transmit signals and receive signals via a wireless access interface, and
    controller circuitry configured in combination with the transceiver circuitry
    to receive a first control signal providing an indication of a set of downlink communications resources of the wireless access interface in which the communications device is to receive a plurality of transport blocks, wherein the plurality of transport blocks comprises a first plurality of transport blocks that are to be received in a first set of downlink communications resources and a second plurality of transport blocks that are to be received in a second set of downlink communications resources, the first set of communications resources and the second set of communications resources being separated in time by a scheduling gap formed by a third set of communications resources of the wireless access interface, and
    to receive, during the scheduling gap, a second control signal indicating at least one change relating to the second plurality of transport blocks.

Paragraph 32. An infrastructure equipment forming part of a wireless communications network, the infrastructure equipment configured to transmit data or receive data and comprising
    transceiver circuitry configured to transmit signals and receive signals via a wireless access interface provided by the wireless communications network, and
    controller circuitry configured in combination with the transceiver circuitry to transmit, to a communications device, a first control signal providing an indication of a set of uplink communications resources of the wireless access interface in which the communications device is to transmit a plurality of transport blocks to the infrastructure equipment, wherein the plurality of transport blocks comprises a first plurality of transport blocks that are to be transmitted in a first set of uplink communications resources and a second plurality of transport blocks that are to be transmitted in a second set of uplink communications resources, the first set of uplink communications resources and the second set of uplink communications resources being separated in time by a scheduling gap formed by a third set of uplink communications resources of the wireless access interface, and to transmit, to the communications device during the scheduling gap, a second control signal providing an indication of at least one change relating to the second plurality of transport blocks.

Paragraph 33. An infrastructure equipment according to Paragraph 32, wherein the at least one change relating to the second plurality of transport blocks is that the scheduling gap is extended in time.

Paragraph 34 An infrastructure equipment according to Paragraph 33, wherein the scheduling gap is extended in time by an amount indicated by the second control signal.

Paragraph 35. An infrastructure equipment according to Paragraph 33 or Paragraph 34, wherein the scheduling gap is extended in time by an amount indicated in a Radio Resource Control, RRC, signalling message transmitted by the infrastructure equipment to the communications device.

Paragraph 36. An infrastructure equipment according to any of Paragraphs 33 to 35, wherein the second control signal indicates that the scheduling gap is to be extended by indicating that the communications device is not to transmit at least one of the second plurality of transport blocks, wherein the first control signal had indicated that the communications device was to transmit the at least one of the second plurality of transport blocks before the others of the second plurality of transport blocks.

Paragraph 37. An infrastructure equipment according to any of Paragraphs 33 to 36, wherein the second control signal indicates that the scheduling gap is to be extended by shifting the second set of uplink communications resources in time.

Paragraph 38. An infrastructure equipment according to any of Paragraphs 33 to 37, wherein the second control signal indicates that the scheduling gap is to be extended by indicating that the communications device is to transmit at least one of the second plurality of transport blocks after the others of the second plurality of transport blocks, wherein the first control signal had indicated that the communications device was to transmit the at least one of the second plurality of transport blocks before the others of the second plurality of transport blocks.

Paragraph 39. An infrastructure equipment according to any of Paragraphs 33 to 38, wherein the second control signal is a group control signal common between the communications device and one or more other communications devices.

Paragraph 40. An infrastructure equipment according to any of Paragraphs 32 to 39, wherein the at least one change relating to the second plurality of transport blocks is that the communications device should not transmit one or more of the second plurality of transport blocks indicated by the first control signal.

Paragraph 41. An infrastructure equipment according to Paragraph 40, wherein the second control signal further comprises feedback indicating whether or not each of the first plurality of transport blocks were successfully received by the infrastructure equipment from the communications device.

Paragraph 42. An infrastructure equipment according to Paragraph 41, wherein if the feedback signal indicates that at least one of the first plurality of transport blocks was not successfully received by the infrastructure equipment, the second control signal further indicates that the communications device is to retransmit the at least one of the first plurality of transport blocks that was not successfully received by the infrastructure equipment in at least a portion of the second set of uplink communications resources.

Paragraph 43. An infrastructure equipment according to any of Paragraphs 40 to 42, wherein the second control signal provides an indication that the infrastructure equipment is going to transmit a downlink signal to the communications device in a set of downlink communications resources of the wireless access interface Paragraph 44. An infrastructure equipment according to Paragraph 43, wherein the downlink signal is associated with a higher priority than the second plurality of transport blocks.

Paragraph 45. An infrastructure equipment according to any of Paragraphs 40 to 44, wherein the second control signal provides an indication that the communications device is to transmit an uplink signal to the infrastructure equipment in at least a portion of the second set of uplink communications resources.

Paragraph 46. An infrastructure equipment according to Paragraph 45, wherein the uplink signal is associated with a higher priority than the second plurality of transport blocks.

Paragraph 47. An infrastructure equipment according to any of Paragraphs 32 to 46, wherein the at least one change relating to the second plurality of transport blocks is a change in at least one communications parameter of the second set of uplink communications resources indicated by the first control signal.

Paragraph 48. An infrastructure equipment according to Paragraph 47, wherein the at least one communications parameter is the physical resources of the wireless access interface forming the second set of uplink communications resources.

Paragraph 49. An infrastructure equipment according to Paragraph 48, wherein the infrastructure equipment is configured to transmit the second control signal in response to determining that at least one of the first plurality of transport blocks was not successfully received from the communications device, the second control signal further indicating that the communications device should transmit sounding reference signals to the infrastructure equipment.

Paragraph 50. An infrastructure equipment according to Paragraph 49, wherein the infrastructure equipment is configured to receive the sounding reference signals from the communications device, to perform measurements on the sounding reference signals, and to transmit a third control signal to the communications device, the third control signal indicating that the communications device is to transmit the second plurality of transport blocks in a set of uplink communications resources of the wireless access interface instead of in the second set of uplink communications resources based on the measurements performed on the sounding reference signals.

Paragraph 51. An infrastructure equipment according to any of Paragraphs 47 to 50, wherein the at least one communications parameter is a transport format with which the communications device is to transmit the second plurality of transport blocks in the second set of downlink communications resources.

Paragraph 52. An infrastructure equipment according to any of Paragraphs 47 to 51, wherein the at least one communications parameter is a number of repetitions with which the communications device is to transmit the second plurality of transport blocks in the second set of downlink communications resources.

Paragraph 53. An infrastructure equipment according to any of Paragraphs 32 to 52, wherein the infrastructure equipment is configured to transmit, to the communications device during the scheduling gap after the second control signal, a third control signal providing an indication of at least one further change relating to the second plurality of transport blocks.

Paragraph 54. A method of operating an infrastructure equipment forming part of a wireless communications network, the infrastructure equipment configured to transmit data or receive data, the method comprising
  transmitting, to a communications device, a first control signal providing an indication of a set of uplink communications resources of the wireless access interface in which the communications device is to transmit a plurality of transport blocks to the infrastructure equipment, wherein the plurality of transport blocks comprises a first plurality of transport blocks that are to be transmitted in a first set of uplink communications resources and a second plurality of transport blocks that are to be transmitted in a second set of uplink communications resources, the first set of uplink communications resources and the second set of uplink communications resources being separated in time by a scheduling gap formed by a third set of uplink communications resources of the wireless access interface, and
  transmitting, to the communications device during the scheduling gap, a second control signal providing an indication of at least one change relating to the second plurality of transport blocks.

Paragraph 55. Circuitry for an infrastructure equipment forming part of a wireless communications network, the infrastructure equipment configured to transmit data or receive data and comprising
  transceiver circuitry configured to transmit signals and receive signals via a wireless access interface provided by the wireless communications network, and
  controller circuitry configured in combination with the transceiver circuitry
  to transmit, to a communications device, a first control signal providing an indication of a set of uplink communications resources of the wireless access interface in which the communications device is to transmit a plurality of transport blocks to the infrastructure equipment, wherein the plurality of transport blocks comprises a first plurality of transport blocks that are to be transmitted in a first set of uplink communications resources and a second plurality of transport blocks that are to be transmitted in a second set of uplink communications resources, the first set of uplink communications resources and the second set of uplink communications resources being separated in time by a scheduling gap formed by a third set of uplink communications resources of the wireless access interface, and
  to transmit, to the communications device during the scheduling gap, a second control signal providing an indication of at least one change relating to the second plurality of transport blocks.

Paragraph 56. A communications device configured to transmit data or receive data, the communications device comprising
  transceiver circuitry configured to transmit signals and receive signals via a wireless access interface, and
  controller circuitry configured in combination with the transceiver circuitry
  to receive a first control signal providing an indication of a set of uplink communications resources of the wireless access interface in which the communications device is to transmit a plurality of transport blocks, wherein the plurality of transport blocks comprises a first plurality of transport blocks that are to be transmitted in a first set of uplink communications resources and a second plurality of transport blocks that are to be transmitted in a second set of uplink communications resources, the first set of uplink communications resources and the second set of uplink communications resources being separated in time by a scheduling gap formed by a third set of uplink communications resources of the wireless access interface, and
  to receive, during the scheduling gap, a second control signal providing an indication of at least one change relating to the second plurality of transport blocks.

Paragraph 57. A method of operating a communications device configured to transmit data to or receive data from an infrastructure equipment of a wireless communications network, the method comprising
  receiving a first control signal providing an indication of a set of uplink communications resources of the wireless access interface in which the communications device is to transmit a plurality of transport blocks, wherein the plurality of transport blocks comprises a first plurality of transport blocks that are to be transmitted in a first set of uplink communications resources and a second plurality of transport blocks that are to be transmitted in a second set of uplink communications resources, the first set of uplink communications resources and the second set of uplink communications resources being separated in time by a scheduling gap formed by a third set of uplink communications resources of the wireless access interface, and
  receiving, during the scheduling gap, a second control signal providing an indication of at least one change relating to the second plurality of transport blocks.

Paragraph 58. A communications device configured to transmit data or receive data, the communications device comprising
  transceiver circuitry configured to transmit signals and receive signals via a wireless access interface, and
  controller circuitry configured in combination with the transceiver circuitry
  to receive a first control signal providing an indication of a set of uplink communications resources of the wireless access interface in which the communications device is to transmit a plurality of transport blocks, wherein the plurality of transport blocks comprises a first plurality of transport blocks that are to be transmitted in a first set of uplink communications resources and a second plurality of transport blocks that are to be transmitted in a second set of uplink communications resources, the first set of uplink communications resources and the second set of uplink communications resources being separated in time by a scheduling gap formed by a third set of uplink communications resources of the wireless access interface, and to receive, during the scheduling gap, a second control signal providing an indication of at least one change relating to the second plurality of transport blocks.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170732, "New WID on Even further enhanced MTC for LTE," Ericsson, Qualcomm, 3GPP TSG RAN Meeting #75, Dubrovnik, Croatia, Mar. 6-9, 2017.
[4] RP-170852, "New WID on Further NB-IoT enhancements," Huawei, HiSilicon, Neul, 3GPP TSG RAN Meeting #75, Dubrovnik, Croatia, Mar. 6-9, 2017.
[5] RP-191356, "Additional MTC enhancements for LTE," Ericsson, 3GPP TSG RAN Meeting #84, Newport Beach, USA, Jun. 3-6, 2019.
[6] RP-191576, "Additional enhancements for NB-IoT," Huawei, 3GPP TSG RAN Meeting #84, Newport Beach, USA, Jun. 3-6, 2019.
[7] Holma H. and Toskala A, "LTE for UMTS OFDMA and SC-FDMA based radio access", John Wiley and Sons, 2009.

What is claimed is:

1. An infrastructure equipment forming part of a wireless communications network, the infrastructure equipment configured to transmit data or receive data and comprising transceiver circuitry configured to transmit signals and receive signals via a wireless access interface provided by the wireless communications network, and controller circuitry configured in combination with the transceiver circuitry to transmit, to a communications device, a first control signal providing an indication of a set of downlink communications resources of the wireless access interface in which the infrastructure equipment is going to transmit a plurality of transport blocks to the communications device, wherein the plurality of transport blocks comprises a first plurality of transport blocks that are to be transmitted in a first set of downlink communications resources and a second plurality of transport blocks that are to be transmitted in a second set of downlink communications resources, the first set of downlink communications resources and the second set of downlink communications resources being separated in time by a scheduling gap formed by a third set of downlink communications resources of the wireless access interface, and to transmit, to the communications device during the scheduling gap, a second control signal providing an indication of at least one change relating to the second plurality of transport blocks.

2. An infrastructure equipment according to claim 1, wherein the at least one change relating to the second plurality of transport blocks is that the scheduling gap is extended in time.

3. An infrastructure equipment according to claim 2, wherein the scheduling gap is extended in time by an amount indicated by the second control signal.

4. An infrastructure equipment according to claim 2, wherein the scheduling gap is extended in time by an amount indicated in a Radio Resource Control, RRC, signalling message transmitted by the infrastructure equipment to the communications device.

5. An infrastructure equipment according to claim 2, wherein the scheduling gap is to be extended by the infrastructure equipment not transmitting at least one of the second plurality of transport blocks, wherein the first control signal had indicated that the infrastructure equipment was going to transmit the at least one of the second plurality of transport blocks before the others of the second plurality of transport blocks.

6. An infrastructure equipment according to claim 2, wherein the second control signal indicates that the scheduling gap is to be extended by shifting the second set of downlink communications resources in time.

7. An infrastructure equipment according to claim 2, wherein the second control signal indicates that the scheduling gap is to be extended by indicating that the infrastructure equipment is going to transmit at least one of the second plurality of transport blocks after the others of the second plurality of transport blocks, wherein the first control signal had indicated that the infrastructure equipment was going to transmit the at least one of the second plurality of transport blocks before the others of the second plurality of transport blocks.

8. An infrastructure equipment according to claim 2, wherein the second control signal is a group control signal common between the communications device and one or more other communications devices, and the infrastructure equipment is configured to transmit the second control signal to each of the communications device and the one or more other communications devices.

9. An infrastructure equipment according to claim 1, wherein the at least one change relating to the second plurality of transport blocks is that the infrastructure equipment is not going to transmit one or more of the second plurality of transport blocks indicated by the first control signal.

10. An infrastructure equipment according to claim 9, wherein the second control signal provides an indication that the infrastructure equipment is going to transmit a downlink signal to the communications device in at least a portion of the second set of downlink communications resources.

11. An infrastructure equipment according to claim 10, wherein the downlink signal is associated with a higher priority than the second plurality of transport blocks.

12. An infrastructure equipment according to claim 9, wherein the second control signal provides an indication that the communications device is to transmit an uplink signal to the infrastructure equipment in a set of uplink communications resources of the wireless access interface.

13. An infrastructure equipment according to claim 12, wherein the uplink signal is associated with a higher priority than the second plurality of transport blocks.

14. An infrastructure equipment according to claim 9, wherein the second control signal indicates that the communications device is to transmit a feedback signal to the infrastructure equipment in a set of uplink communications resources of the wireless access interface, the feedback signal indicating, for each of the first plurality of transport blocks, whether or not the each of the first plurality of transport blocks was successfully received by the communications device from the infrastructure equipment.

15. An infrastructure equipment according to claim 9, wherein the second control signal indicates that the communications device is to terminate reception of at least one of the second plurality of transport blocks, and in response the infrastructure equipment is configured to receive a feedback signal from the communications device in a set of uplink communications resources of the wireless access interface, the feedback signal indicating, for each of the first plurality of transport blocks, whether or not the each of the first plurality of transport blocks was successfully received by the communications device from the infrastructure equipment.

16. An infrastructure equipment according to claim 9, wherein the second control signal indicates that the communications device is to transmit a feedback signal to the infrastructure equipment, the feedback signal indicating, for each of the first plurality of transport blocks, whether or not the each of the first plurality of transport blocks was successfully received by the communications device from the infrastructure equipment, wherein the feedback signal is to be transmitted in a set of uplink communications resources of the wireless access interface associated with the second set of downlink resources.

17. An infrastructure equipment according to claim 9, wherein the second control signal indicates that the communications device is to terminate reception of at least one of the second plurality of transport blocks, and in response the infrastructure equipment is configured to receive a feedback signal from the communications device, the feedback signal indicating, for each of the first plurality of transport blocks, whether or not the each of the first plurality of transport blocks was successfully received by the communications device from the infrastructure equipment, wherein the feedback signal is to be transmitted in a set of uplink communications resources of the wireless access interface associated with the second set of downlink resources.

18. An infrastructure equipment according to claim 1, wherein the at least one change relating to the second plurality of transport blocks is a change in at least one communications parameter of the second set of downlink communications resources indicated by the first control signal.

19. A method of operating an infrastructure equipment forming part of a wireless communications network, the infrastructure equipment configured to transmit data or receive data, the method comprising
transmitting, to a communications device, a first control signal providing an indication of a set of downlink communications resources of the wireless access interface in which the infrastructure equipment is going to transmit a plurality of transport blocks to the communications device, wherein the plurality of transport blocks comprises a first plurality of transport blocks that are to be transmitted in a first set of downlink communications resources and a second plurality of transport blocks that are to be transmitted in a second set of downlink communications resources, the first set of downlink communications resources and the second set of downlink communications resources being separated in time by a scheduling gap formed by a third set of downlink communications resources of the wireless access interface, and
transmitting, to the communications device during the scheduling gap, a second control signal providing an indication of at least one change relating to the second plurality of transport blocks.

20. A communications device configured to transmit data or receive data, the communications device comprising
transceiver circuitry configured to transmit signals and receive signals via a wireless access interface, and
controller circuitry configured in combination with the transceiver circuitry
to receive a first control signal providing an indication of a set of downlink communications resources of the wireless access interface in which the communications device is to receive a plurality of transport blocks, wherein the plurality of transport blocks comprises a first plurality of transport blocks that are to be received in a first set of downlink communications resources and a second plurality of transport blocks that are to be received in a second set of downlink communications resources, the first set of communications resources and the second set of communications resources being separated in time by a scheduling gap formed by a third set of communications resources of the wireless access interface, and
to receive, during the scheduling gap, a second control signal indicating at least one change relating to the second plurality of transport blocks.

* * * * *